US012640635B2

(12) United States Patent
Renedo Anglada et al.

(10) Patent No.: US 12,640,635 B2
(45) Date of Patent: May 26, 2026

(54) SELF GUIDED LINEAR INDUCTION MOTOR SYSTEM AND METHOD

(71) Applicant: Swisspod Technologies Sa, Monthey (CH)

(72) Inventors: Jaime Renedo Anglada, Niskayuna, NY (US); Dario Bueno-Baques, Colorado Springs, CO (US)

(73) Assignee: Swisspod Technologies SA, Monthey (CH)

( * ) Notice: Subject to any disclaimer, the term of this patent is extended or adjusted under 35 U.S.C. 154(b) by 544 days.

(21) Appl. No.: 18/267,409

(22) PCT Filed: Dec. 16, 2021

(86) PCT No.: PCT/CH2021/050027
§ 371 (c)(1),
(2) Date: Jun. 14, 2023

(87) PCT Pub. No.: WO2022/126287
PCT Pub. Date: Jun. 23, 2022

(65) Prior Publication Data
US 2024/0055967 A1    Feb. 15, 2024

(30) Foreign Application Priority Data
Dec. 17, 2020    (CH) .................................... 01613/20

(51) Int. Cl.
*H02K 41/02*    (2006.01)
*H02K 1/02*    (2006.01)

(52) U.S. Cl.
CPC ............... *H02K 41/02* (2013.01); *H02K 1/02* (2013.01); *H02K 2201/03* (2013.01)

(58) Field of Classification Search
CPC ........... H02K 2213/09; H02K 2213/03; H02K 2201/03; H02K 1/02; H02K 17/14;
(Continued)

(56) References Cited

U.S. PATENT DOCUMENTS

| 3,161,814 A | 12/1964 | Williams et al. |
| 3,585,423 A | 6/1971 | Bolton et al. |

(Continued)

FOREIGN PATENT DOCUMENTS

| DE | 2063358 | 3/1972 |
| GB | 1211200 | 11/1970 |

(Continued)

OTHER PUBLICATIONS

Li et al. (CN 1976185) High Power Hybrid Linear (Year: 2007).*
(Continued)

*Primary Examiner* — Jorge L Carrasquillo
(74) *Attorney, Agent, or Firm* — McCarter & English, LLP; Jeffrey Mann

(57) ABSTRACT
A polyphase linear induction motor including a movable primary member (100), the primary member (100) including a magnetic material (110), a polyphase winding (120) arranged around the magnetic material, and a stationary longitudinally-extending secondary member (150) separated from the primary member (100) by a gap, the secondary member (150) including an electrically-conductive reaction plate (200) and a backing magnetic material (300), wherein the secondary member includes a middle section (205) and two outer sections (210.1, 210.2), the middle section (205) and the two outer sections (210.1, 210.2) arranged next to each other in parallel to an axis of longitudinal extension of the reaction plate (200).

14 Claims, 17 Drawing Sheets

(58) Field of Classification Search
CPC .. H02K 41/025; H02K 41/02; B60L 2220/50; B60L 15/005; H02P 25/062
USPC ........................................................ 318/687
See application file for complete search history.

(56) References Cited

U.S. PATENT DOCUMENTS

| | | | |
|---|---|---|---|
| 3,616,763 | A | 11/1971 | Colling et al. |
| 3,667,397 | A | 6/1972 | Haynes |
| 3,860,840 | A | 1/1975 | Laronze |
| 4,027,597 | A | 6/1977 | Lang |
| 4,061,089 | A | 12/1977 | Sawyer |
| 4,388,543 | A | 6/1983 | Guimbal |
| 5,483,111 | A * | 1/1996 | Kuznetsov ............... H02K 3/28 318/135 |
| 6,129,025 | A * | 10/2000 | Minakami ............... B60L 13/03 104/88.01 |
| 10,020,716 | B2 * | 7/2018 | Atmur .................... H02K 17/16 |
| 10,491,093 | B2 * | 11/2019 | Hadziristic .............. H02K 1/02 |
| 2018/0183312 | A1 | 6/2018 | Safaee et al. |

FOREIGN PATENT DOCUMENTS

| | | | |
|---|---|---|---|
| JP | 48-27521 | A | 4/1973 |
| JP | 50-104111 | U | 8/1975 |
| JP | 58-108958 | A | 6/1983 |
| JP | 60229664 | | 11/1985 |
| JP | 63-80755 | A | 4/1988 |
| JP | 3-104080 | U | 10/1991 |
| KR | 10-2009-0017514 | A | 2/2009 |

OTHER PUBLICATIONS

Morishita et al. (JP 2563912 B2) Floating Carrier (Year: 1996).*
Han et al. (KR 20120118797 A) Magnetic Levitation Craft Haviang Permanent Magnet Module (Year: 2012).*
United Arab Emirates Search Report and Office Action for Application No. P6001472/2023, dated Feb. 24, 2025.
International Written Opinion for International Application No. PCT/CH2021/050027 dated Apr. 25, 2022, 6 pages.
International Search Report and Written Opinion for International Application No. PCT/CH2021/050027 dated Apr. 25, 2022, 6 pages.
International Written Opinion for International Application No. PCT/CH2021/050026 dated Apr. 25, 2022, 9 pages.
International Search Report and Written Opinion for International Application No. PCT/CH2021/050026 dated Apr. 25, 2022, 6 pages.
European Office Action for Application No. 21848239.6, dated Feb. 9, 2026, 8 pages.
Japanese Office Action for Application No. 2023-561413, dated Dec. 23, 2025, 14 pages.

* cited by examiner

SELF GUIDED LINEAR INDUCTION MOTOR SYSTEM AND METHOD

CROSS-REFERENCE TO RELATED APPLICATIONS

The present application for Patent is a national stage application under 35 U.S.C. 371 based on and claiming the benefit of International Application Serial No. PCT/CH2021/050027 filed on Dec. 16, 2021 which claims the benefit of priority to earlier Swiss patent Application No. CH 01613/20 entitled "LINEAR INDUCTION MOTORS AND SYSTEMS" filed Dec. 17, 2020 and assigned to Swisspod Technologies SA and the entire contents of each of which are hereby expressly incorporated in its entirety by reference in the present application.

FIELD OF THE DISCLOSURE

The present invention relates generally to linear induction machines used to propel and levitate vehicles, objects, or devices in a linear direction. In particular, but not by way of limitation, this invention relates to the use of polyphase linear induction motors for non-contact combined propulsion and levitation systems used for example in transportation and the systems, devices, apparatuses and methods to control such.

DESCRIPTION OF RELATED ART

A linear induction motor (LIM) is an electrical machine that uses an alternating current supply to generate force. The working principle of a LIM is the same of that of a rotating induction motor but produces force and motion in a linear direction.

Linear induction motors are composed by a core or primary that refers to the stator windings or armature and the magnetic yoke and a secondary or reaction plate that refers to a conductive plate where currents are induced and that is separated from the primary by a defined distance referred as gap.

In linear induction motor configurations or topologies with only one stator core, an additional plate of a high magnetic permeability material is normally added after the conductive plate to reinforce the magnetic flux in the gap. This is normally referred as the back iron or mirror plate.

Conventional motors used in transportation systems use polyphase primaries, hitherto the primary windings are energized with a polyphase current. That is the phase of the alternating current applied to the windings placed in the slots of the primary is different for a set of such windings and in general the phase interval is equal between the plurality of phases.

The primary and secondary of the motor are arranged and relatively positioned as to provide low reluctance paths, in which the magnetic flux linking the primary and secondary passes through the electrically conductive plate. This flux is denoted as working magnetic flux. During operation the flux driven by the energized windings induces electrical currents in the conductive plate of the secondary, which react with the flux to create a propulsive and repulsive forces between the primary and the secondary of the machine. The ratio between the propulsive and repulsive forces depends on the configuration of the machine and the frequency of the polyphase current used to energize the windings.

Linear motor as such, including possible different arrangements between the primary and secondary of the motors, have been extensively described in previous publications as for example U.S. Pat. Nos. 4,727,387, 3,585,423, 3,958,138, 5,105,110, 7,271,509, and 10,044,251 and many cited references therein all incorporated by reference in their entirety in the present application.

In linear induction motors, only such section of the secondary that is immediately underneath of the primary is subjected to a magnetic flux generated by the primary. Hereto, a continuous induced magnetomotive force is created in the unexcited zones of the secondary, thereby opposing the establishment of a working magnetic flux in the front-end of the primary. This is a known problem in linear induction motors and is referred as end-effect. The end-effect induced current in the conductive plate demagnetize the oncoming end of the motor primary, herein producing opposing forces and additional losses that increase with the relative speed of the primary in respect to the secondary. Similarly, an equivalent effect is present in the outgoing section of the primary.

Moreover, linear induction motors experience a phase imbalance resulting from the apparent finite length of the windings for a given phase. This is further amplified by the previously described end-effect, which distorts the air-gap magnetic flux density, having a direct effect on the flux linked to the phase windings.

Furthermore, the thrust, power factor and efficiency of linear induction machines decrease notably when operating at high speeds.

In the co-pending/concurrently filed international patent application No. PCT/CH2021/050026 filed on Dec. 16, 2021 in the name of Swisspod Technologies SA, the content of which application is incorporated in its entirety by reference in the present application, a linear induction motor M, system and method has been proposed, to change the composition of the reaction plate in terms of resistivity/conductivity along an axis of longitudinal extension, to provide means for increasing the thrust at high speeds. The description and figures of this concurrently filed application PCT/CH2021/050026 is entirely added in the present description for the sake of completeness. Embodiments of the present invention may be combined with embodiments of this co-pending application and protection may be sought for all embodiments and/or combinations by claims covering such subject-matter, embodiments, features and combinations.

Moreover, the levitation forces in a linear induction motor will increase with the increase in the frequency of the exiting current in the windings. This effect has been proposed before to be employed as means to achieve magnetic levitation in combination with the thrust as for example described in the U.S. Pat. No. 3,858,521 incorporated by reference in its entirety in the present application.

However, in the field of guidance methods, devices, and systems for linear induction motors, there is still a strong need for additional and simplified solutions, to reduce cost and simplify operation of the guidance system.

Accordingly, it is therefore an aim of the present invention to improve the known solutions, products and methods and achieve the above-mentioned aims.

SUMMARY

The following presents a simplified summary relating to embodiments or aspects disclosed herein. As such, this summary should not be considered an extensive overview relating to all contemplated to the disclosure, nor should the following summary be regarded to identify key or critical elements relating to all contemplated aspects and/or embodiments or to delineate the scope associated with any particular aspect and/or embodiment.

Moreover, the following summary has the sole purpose to present concepts relating to one or more aspects and/or embodiments relating to the mechanisms disclosed herein in a simplified form to precede the detailed description presented below.

According to one aspect of the present invention, a polyphase linear induction motor is provided. Preferably, the linear induction motor includes a movable primary member, the primary member including a magnetic material, a polyphase winding arranged around the magnetic material and a stationary longitudinally-extending secondary member separated from the primary member by a gap, the secondary member including an electrically-conductive reaction plate and a backing magnetic material. In addition, preferably, the electrically-conductive reaction plate includes a middle section and two outer sections, the middle section and the two outer sections arranged next to each other in parallel to an axis of longitudinal extension of the reaction plate. According to another aspect of the present invention, a stationary longitudinally-extending secondary member of a polyphase linear induction motor is provided. Preferably the stationary longitudinally-extending secondary member includes an electrically-conductive reaction plate, and a backing magnetic material, wherein the electrically-conductive reaction plate includes a middle section and two outer sections, the middle section and the two outer sections arranged next to each other in parallel to an axis of longitudinal extension of the reaction plate.

According to still another aspect of the present invention, a method is proposed to provide guidance and levitation to a vehicle powered by a linear induction motor having a specific configuration, where the guidance is not provided by an active guiding system, but by the use of the linear induction motor that is used for propulsion and having a specific arrangement of lateral or side reaction plate elements.

Some embodiments of the disclosure may be characterized as a description for linear induction machine and arrangement that in combination with providing thrust can provide levitation and a self-guiding mechanism to keep such machine aligned to a guideway. The machine is composed by a polygonal primary that generates a working flux that transverses the gap between the primary and the secondary of the machine, cooperates with currents induced in an assembly of reactions plate that of the secondary of the machine due to the time variation of said flux to produce a propulsive force or thrust, a levitation force and guidance forces.

In embodiments the invention concerns a polyphase linear induction motor comprising:

a movable primary member, the primary member including a magnetic material, a polyphase winding arranged around the magnetic material; and a stationary longitudinally-extending secondary member separated from the primary member by a gap, the secondary member including an electrically-conductive reaction plate and a backing magnetic material, wherein the electrically-conductive reaction plate includes a middle section and two outer sections, the middle section and the two outer sections arranged next to each other in parallel to an axis of longitudinal extension of the reaction plate.

In embodiments of the invention the two outer sections have a higher electric conductivity as compared to an electric conductivity of the middle section.

In embodiments of the invention the two outer sections do not have a backing magnetic material arranged adjacent to the two outer sections.

In embodiments of the invention at least one winding of the polyphase winding of the movable primary member includes a Gramme-type winding arranged to have a trapezoidal shape.

In embodiments of the invention an angle of inclination between the outer sections and the middle section is oblique when viewed in a direction of the axis of longitudinal extension.

In embodiments of the invention the reaction plate includes additional outer sections, an angle of inclination of the additional outer sections being different from an angle of inclination of the outer sections.

In embodiments of the invention an angle of inclination between the outer sections and the middle section is different at a first section and a second section along the axis of longitudinal extension of the reaction plate, the first section being located at a different location than the second section.

In embodiments of the invention an electric conductivity of the middle section of the reaction plate is variable along an axis of longitudinal extension of the secondary member.

In embodiments of the invention the middle section of the reaction plate includes a stack of layers, each layer of the stack of layers made of a different material composition providing for a different electrical conductivity.

In embodiments of the invention the magnetic material of the movable primary member includes a middle section and two outer sections, the middle section and the two outer sections facing the middle section and the two outer sections of the reaction plate, respectively, via a gap.

In embodiments of the invention a cross-sectional shape of the magnetic material of the movable primary member has a trapezoidal shape, when viewed in a direction of the axis of longitudinal extension, with surfaces of the two outer sections forming side legs of the trapezoidal shape.

In embodiments of the invention the angle of inclination between the two outer sections and the middle section of the movable primary member are oblique when viewed in a direction of the axis of longitudinal extension.

In embodiments of the invention the two outer sections of the movable primary member and the two outer sections of the reaction plate are arranged to be parallel to each other, respectively.

In embodiments the invention concerns a stationary longitudinally-extending secondary member of a polyphase linear induction motor comprising:

an electrically-conductive reaction plate; and a backing magnetic material, wherein the electrically-conductive reaction plate includes a middle section and two outer sections, the middle section and the two outer sections arranged next to each other in parallel to an axis of longitudinal extension of the reaction plate.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIGS. 19B and 19C show two graphs illustrating the maximum thrust T as a function of speed for different material configurations of conductive reaction plate 200;

Herein, identical reference numerals are used, where possible, to designate identical elements that are common to the figures. Also, the representations in the different drawings are simplified for illustration purposes and may not be depicted to scale.

DETAILED DESCRIPTION OF THE SEVERAL EMBODIMENTS

The word "exemplary" is used herein to mean "serving as an example, instance, or illustration." Any embodiment described herein as "exemplary" is not necessarily to be construed as preferred or advantageous over other embodiments.

Various embodiments of the invention are described in more detail hereinafter with reference to the accompanying drawings. The invention maybe embodied in many forms and should not be construed as limited to the embodiments set forth herein; rather, these embodiments are provided so this disclosure satisfies applicable requirements.

The terminology used herein is for the purpose of describing specific embodiments only and is not intended to be limiting of the invention. As used herein, the term "and/or" includes all and any combinations of one or more of the associated listed items.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claim.

Figure 1A:
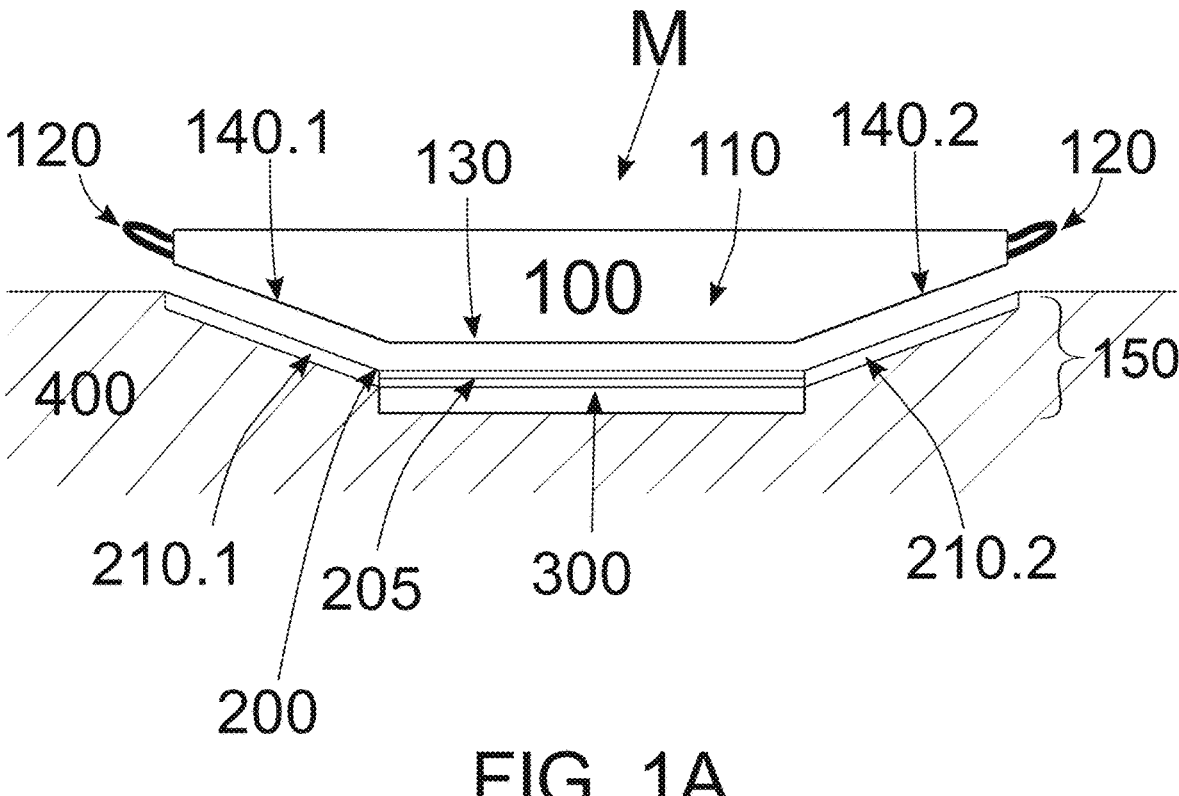
FIG. 1A is a cross-sectional exemplary representation linear induction motor M, exemplarily shown as a singled-sided linear induction motor, having a secondary member or assembly 150 having a conductive reaction plate 200 including outer sections 210.1 and 210.2 at the left and right hand side, in addition to a middle section 205 arranged at the center.

FIG. 1A shows a cross-sectional view of polyphase linear induction motor M according to one aspect of the present invention, the cross-sectional view being in a direction of an axis of longitudinal extension or a driving direction of the linear induction motor M. The linear induction motor M includes a movable primary member 100, movable primary member 100 including a magnetic material 110 having a plurality of slots, a polyphase winding 120 arranged around the magnetic material 110, and a stationary longitudinally-extending secondary member 150 separated from the primary member 100 by a gap, the secondary member 150 including an electrically-conductive reaction plate 200 and a backing magnetic material 300. This arrangement of linear induction motor M is exemplary, and is similar to the one shown in the concurrently filed international patent application PCT/CH2021/050026 this reference herewith incorporated by reference in its entirety, and described in detail hereunder.

Moreover, the electrically-conductive reaction plate 200 includes a middle section 205 and two outer sections 210.1, 210.2, the middle section 205 and the two outer sections 210.1, 210.2 arranged next to each other in parallel to the axis of longitudinal extension of conductive reaction plate 200 or driving direction of the primary member 100, or in other words, outer sections 210.1 and 210.2 arranged to be laterally arranged to middle section 205. As can be seen in FIG. 1A, the two outer sections 210.1 and 210.2 are arranged to contact with corresponding side walls of middle section 205 along the axis of longitudinal extension, for example as separate plates or layer, or to form a contiguous plate or layer, but it is also possible that the side walls of outer sections 210.1 and 210.2 do not contact side walls of the middle section 205, and they are separated from each other by a distance.

Preferably, the two outer sections 210.1, 210.2 are made of a material or composition that has a higher electric conductivity as compared to a material or composition of the conductive middle section 205. For example, the two outer sections 210.1 and 210.2 can be made of Aluminum (Al), Copper (Cu) or another highly conductive material. Moreover, preferably, the two outer sections 210.1, 210.2 do not have a backing magnetic material 300 arranged next to it, for example as a second layer below the outer sections 210.1, 210.2 substantially parallel to a plane formed by the respective outer section 210.1, 210.2, as compared to the middle section 205, where the backing magnetic material 300 is arranged, for example below the middle section 205, to be in contact with middle section 205 of conductive reaction plate. Also, as shown in FIG. 1A as an exemplary embodiment, an angle of inclination between the outer sections 210.1, 210.2 and the middle section 205 is oblique when viewed in a direction of the axis of longitudinal extension, for example the same angle for both sides. However, in a variant, it is also possible that the two outer sections 210.1 and 210.2 are arranged to be in parallel to a plane that is defined by the middle section, and substantially arranged in axis.

Figure 1B:
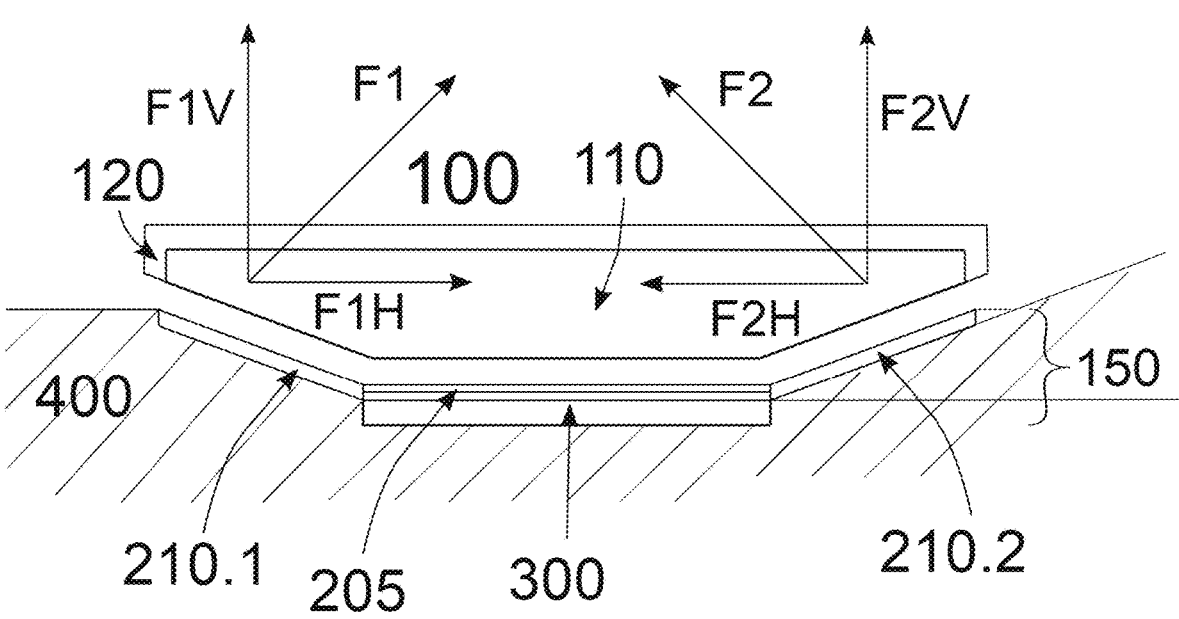
FIG. 1B shows a representation of the forces F1, F2, acting on primary member 100 based on the cross-sectional view of FIG. 1A.

FIG. 1B shows different forces F1, F2 that can act on movable primary member 100, for example during a propulsion of movable primary member 100 with a polyphase current or voltage that is supplied to polyphase winding 120. Preferably, a cross-sectional shape of the magnetic material 110 of movable primary member 100 is trapezoidal, having two side legs that are arranged to be substantially in parallel to the two respective outer sections 210.1 and 210.2. In a movement or moving direction of movable primary member 100, for in a direction of the axis of longitudinal extension of the secondary member 150, a propulsive force can be generated from both middle section 205 and outer sections 210.1 and 210.2 of secondary member 150. In addition, forces F1, F2 are generated to be in a plane that is perpendicular to the moving direction, where a force F1 is generated that urges the primary member 100 in a direction away from the secondary member 150, a direction that is perpendicular to a direction defined by a plane formed by secondary member 150, herein referred to as the Y-axis. A side direction of the plane formed by secondary member 150 is herein defined as the X-axis. Force F1 will vary in amplitude with a frequency of the supply voltage or current to polyphase winding 120, and at a certain frequency, which also translates into a certain relative speed of primary member 100 versus secondary member 150, force F1 is sufficient to provide for levitation or a lifting force of primary member 100.

In addition, two forces F2 are generated and that are arranged to be perpendicular to a plane of extension of the respective outer sections 210.1 and 210.2. In the case where outer sections 210.1 and 210.2 are obliquely arranged with respect to middle section 205, each force F2 has a component that is in the Y-axis, herein referred to as F2V, for example a force component that is vertical, and each force F2 has another component in the X-axis, for example a force that is horizontal, herein referred to as F2H with two such force components acting against each other from each side of outer sections 210.1 and 210.2. These horizontally-arranged force components F2H of forces F2 basically act as a guiding force to primary member 100, stabilizing primary member 100 to a center of middle section 205, assuming that the two outer sections 210.1 and 210.2 have substantially similar or the same dimensions and are axi-symmetrically arranged towards each other, the axis or plane of symmetry being defined as a plane that is parallel to the Y-axis, arranged to cross in the middle or center of middle section 205. Moreover, the two vertically directed components F2V of forces F2 provide for additional lifting or levitation forces to primary member 100.

Figure 2:
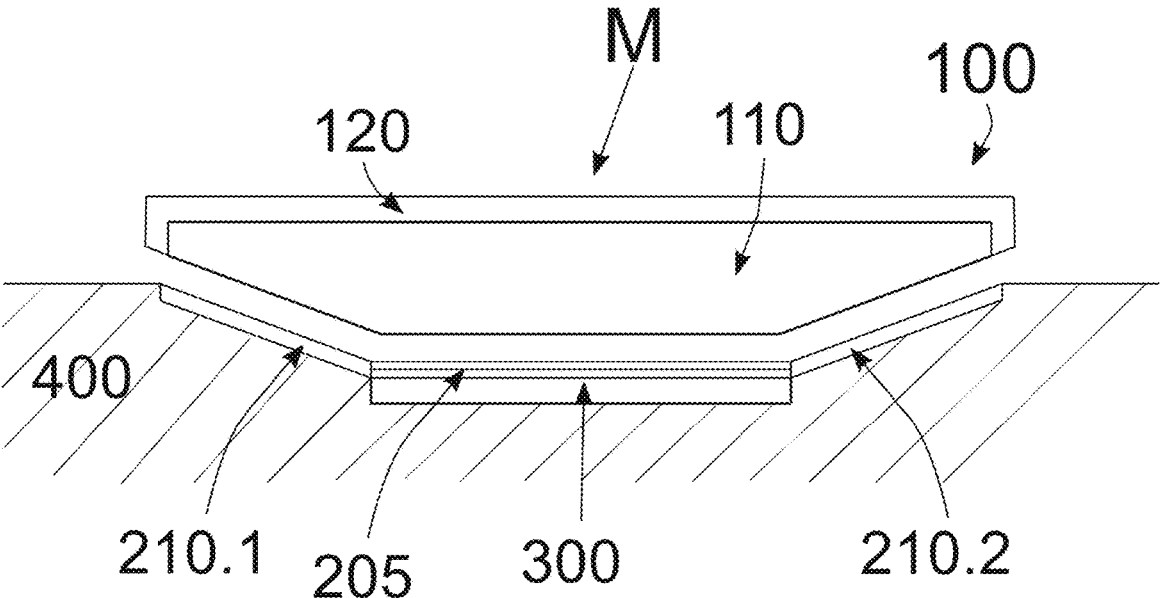
FIG. 2 shows a cross-sectional exemplary representation motor M with a specific arrangement of the polyphase winding 120 in the primary member or element 100 of motor M.

FIG. 2 shows another embodiment of the present invention, where polyphase winding 120 has individual phase windings 121, 122, 123 that are arranged in the Gramme-type configuration. Gramme style coils or Gramme type windings for linear induction motors have been described in the patent publications DE2265049A1 and GB1288985 for example. For example, the individual windings 121, 122, 123 of the polyphase winding 120 can be supplied with a polyphase current or voltage, for example but not limited to a three-phase voltage system from a three-phase power converter.

According to another aspect of the present invention, with the aspects of the linear induction motor M as described herein, it is possible to increase or enhance a propulsive thrust or force and a lifting or levitation force of the movable primary member 100 at high speeds, in addition to the structure and configuration of a reaction plate 200 that has a variable resistivity along an axis of longitudinal extension, to provide for a higher resistivity at sections of secondary member 200 intended for or designed for higher speeds, and by no way of limitation, can be achieved as well using dissimilar arrangements of magnetic yoke 110 and polyphase windings 120 as such described in the previous art as for example disclosed in U.S. Pat. Nos. 3,585,423 and 3,958,138 and references therein. Accordingly, for the sake of clarity, the embodiment in FIGS. 1 and 2 herein is a representation of the cooperation of magnetic yoke and stator windings in general and should be understood as a general reference to a primary in a single sided linear induction motor, but could be applied to other types and configurations of linear induction motors.

In the exemplary embodiments represented by FIGS. 1 and 2, the working flux, considered as the magnetic flux that transverses the gap between primary and secondary member 100, 150 of motor M, cooperates with currents induced in conductive reaction plate 200 of secondary member 150 of motor M due to the time variation of the magnetic flux to produce a propulsive force or thrust and also levitation.

It should be understood that in all embodiments of described herein, the magnetic material of both primary member 100 and secondary member 150 lie in transversely planes defined by these members 100, 150 to provide in cooperation a low reluctance path for the working flux which is itself oriented transversely to motor M. With the herein described motor M, it is also possible to provide for a method and system having motor M to provide for lateral, self-guiding at high thrust and high speeds, with the horizontally-arranged opposing forces F2 acting on primary member 100.

Figure 3:
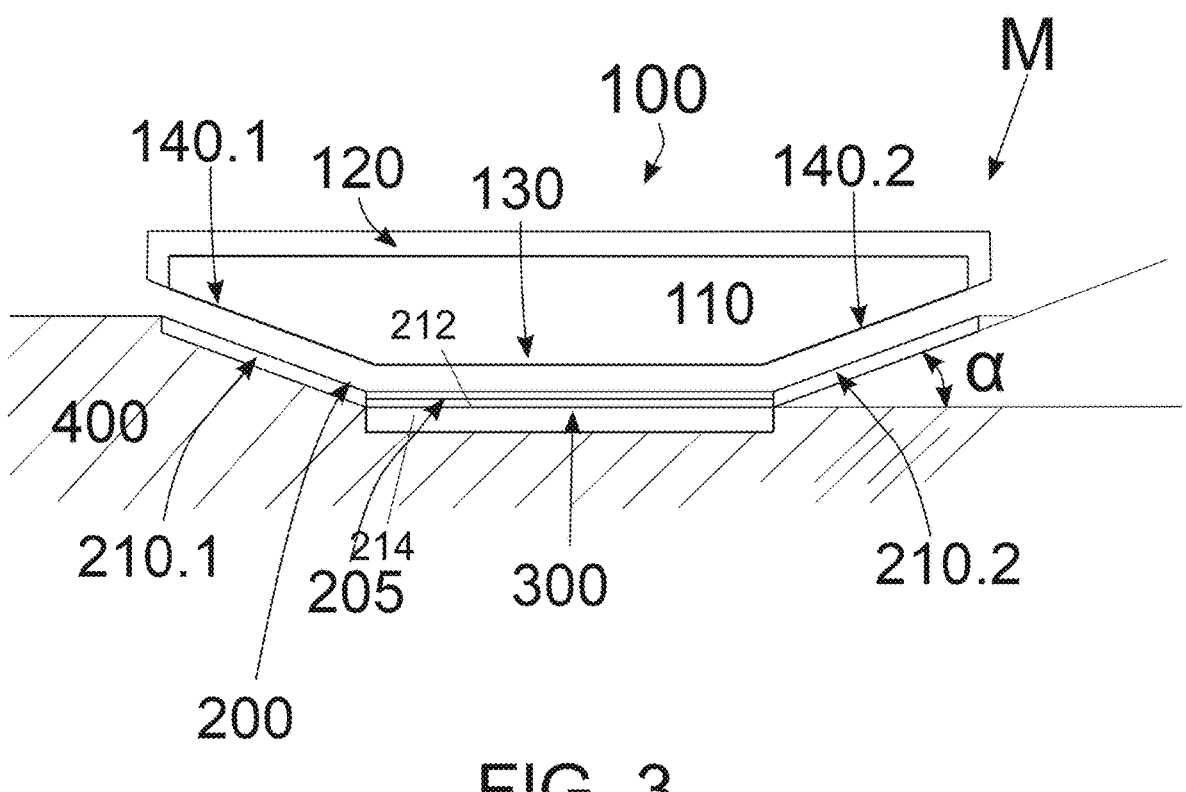
FIG. 3 shows a cross-sectional exemplary representation motor M with aspects of conductive reaction plate 200, having a middle section 205 with a composite reaction plate made of two or more layers 212, 214.

FIG. 3 shows an embodiment where a plane that defines an extension outer sections 210.1 and 210.2 is arranged obliquely to a plane defined by an extension of middle section 205 by an angle α. Preferably, both outer sections 210.1 and 210.2 are arranged at the same angle α for axi-symmetry. Preferably, a range of the angle α can be anything between 0° to 90°, where 0° is a setup where no lateral guidance by forces F2H are provided, and 90° an example for maximal lateral guiding forces F2H.

With a steeper angle, for example an angle of 60°, the horizontal component F2H of forces F2 can be larger than the vertical component F2V, whilst at a flatter angle α, for example an angle of 30°, the horizontal component F2H of forces F2 can be smaller than vertical component F2V. Therefore, depending on the requirements for guiding a vehicle that is attached to primary member 100, angle α can be selectively chosen to provide for a specific force F2H as a guidance force in addition to levitation force provided by F2V and by F1. At an angle α that is equal to 45°, F2V and F2H will be substantially the same.

Figure 4:
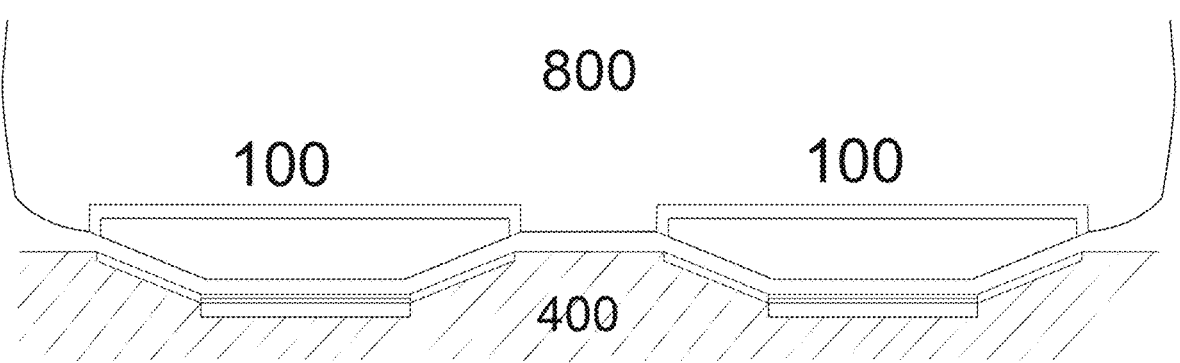
FIG. 4 shows a cross-sectional exemplary representation a possible application for motor M for a vehicle 800.

FIG. 4 shows an embodiment where two primary members 100 are arranged to be next to each other, both magnetic cores 110 of primary members 100 having a trapezoidal cross-sectional shape, for example as a motor M for a transportation system, both primary members 100 being operatively attached to a vehicle 800, whereas both secondary members 150 have a reaction plate 200 with outer sections 210.1 and 210.2 and a middle section 205, integrated, attached, or otherwise arranged to a trackway 300. Moreover, reaction plate or layer 200 is shown to be made of a stack of layers, for example two layers 212, 214, for example layers 212, 214 having a different material composition, for example but not limited to layers with dissimilar magnetic and electric properties, as shown in the concurrently filed and incorporated international patent application PCT/CH2021/050026.

Figure 5:
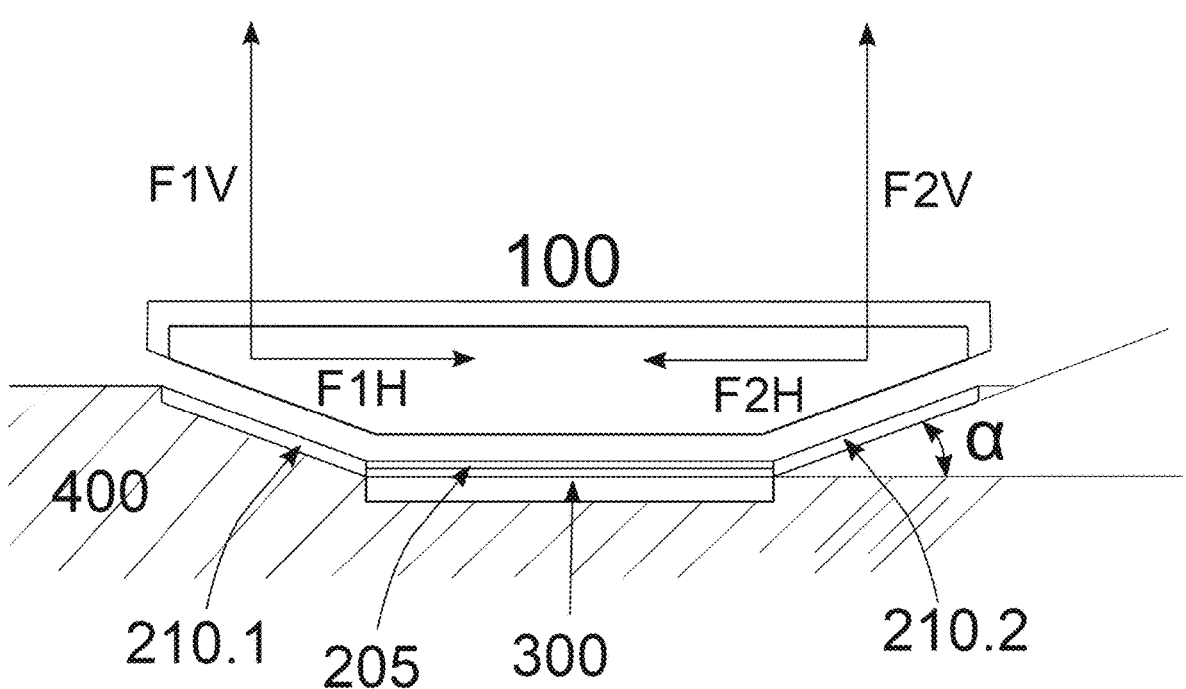
FIG. 5 shows another representation of the forces F1, F2, acting on primary member 100 and showing an inclination angle α of the outer sections 210.1 and 210.2.

As explained with reference to FIG. 1B and as further illustrated in FIG. 5, a levitation force in the slanted outer sections 210.1 and 210.2 by angle α will result on force F2 with force components F2H and F2V. The F2V force component will result in a contribution to the levitation to primary member 100 of motor M, while the F2H force components act against each other and will provide self-alignment and guidance along secondary member 200 and guideway 300.

Figure 6:
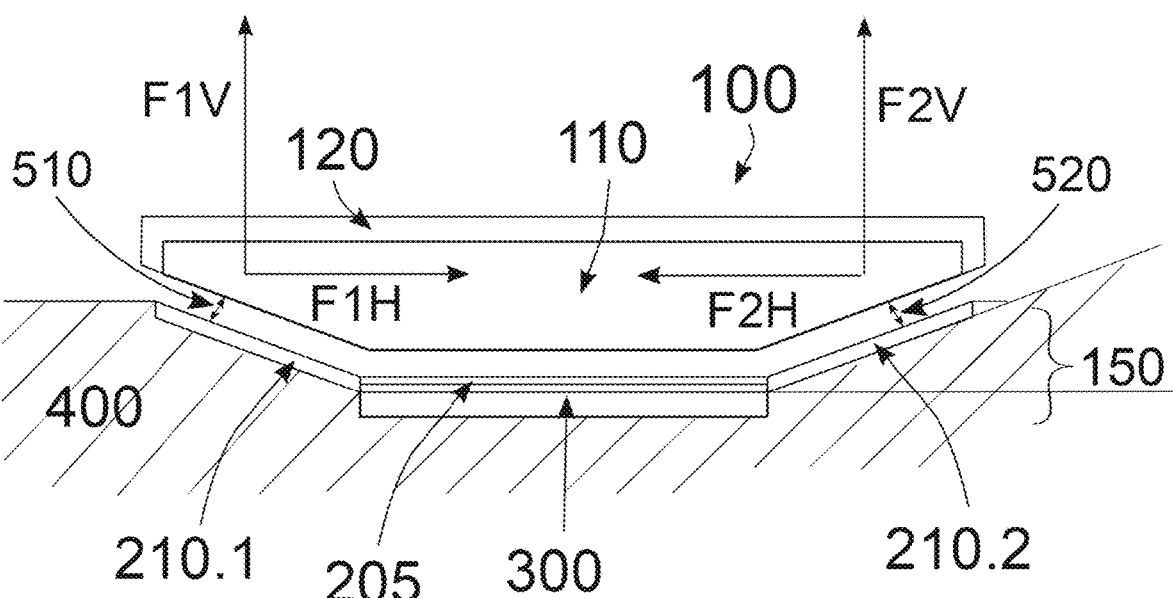
FIG. 6 shows an embodiment of the arrangement according to the embodiment in FIG. 3 of the invention, illustrating the air gaps 510, 520 between primary and secondary member 100, 150.

FIG. 6 shows an air gap 510 between left outer section 210.1 and outer surface of left outer section 140.1 of magnetic material 110 of primary member 100, and air gap 520 between right outer section 210.2 and outer surface of right outer section 140.2 of magnetic material 110 of primary member 100. With the axi-symmetrical arrangement of the two slanted outer sections 210.1, 140.1 and 210.2, 140.2, it is possible that the distances formed by air gaps 510 and 520 will be self-adjusted to be constant. For example, if the air gap 520 becomes smaller as compared to air gap 510, force F2H at the right will increase accordingly due to the smaller air gap, as a result of the increase of induced currents in the corresponding outer section 210.2, by cooperation between primary member 100 and corresponding outer section 210.2. This will result on an increase of the force components F2H and F2V that will restitute the equilibrium alignment of primary element 100 in respect to the secondary assembly or element 150, including outer sections 210.1 and 210.2 and middle section 205. The aforementioned operation resulting from the cooperation between primary and secondary member 100, 150 assembly will result in a self-guided displacement of primary member 100 along the guideway 300 where the secondary assembly or element 150.

Thereby, with the herein presented linear induction motor M, secondary member 150 and the specific arrangement of the reaction plates with outer sections 210.1, 210.2, it is possible to provide for lateral guidance forces that are self-equilibrating and passively correcting, only with the need of the main polyphase winding 120 of primary member 100 that is being supplied with the polyphase power, and with no additional requirements such as additional windings or coils of an electromagnet of an active guidance system, for example one that requires distance measuring and active power control with additional auxiliary windings or coils.

Figures 7, 8:
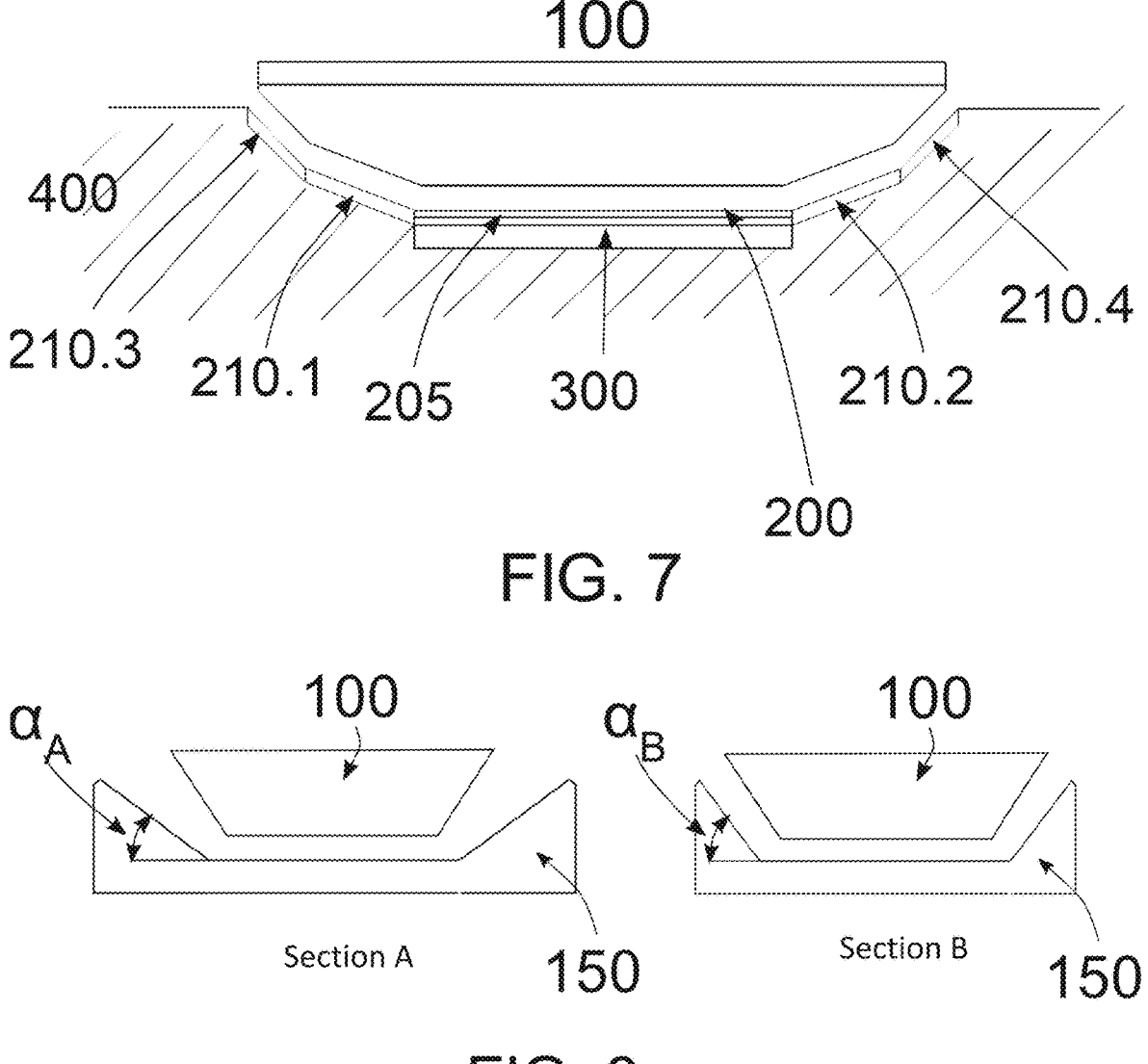
FIG. 7 shows another embodiment with a cross-sectional view, where wherein the reaction plate 200 includes additional outer sections 210.3, 210.4 that are arranged adjacent to a respective one of the outer sections 210, 210.2, an angle of inclination of the additional outer sections 210.3, 210.4 being different and steeper from an angle of inclination of the outer sections 210.1, 210.2.
FIG. 8 shows another embodiment with a cross-sectional view of two sections A and B at different locations along the axis of longitudinal extension of secondary member 150, with an angle of inclination between the outer sections 210.1, 210.2 and the middle section 205 being different at section A and second B along the axis of longitudinal extension of the reaction plate 200, section A being located at a different location than section B.

FIG. 7 shows another embodiment with a cross-sectional view, where wherein the reaction plate 200 includes additional outer sections 210.3, 210.4 that are arranged adjacent to a respective one of the outer sections 210.1, 210.2, an angle of inclination of the additional outer sections 210.3, 210.4 being different and steeper from an angle of inclination of the outer sections 210.1, 210.2.

Moreover, it is possible that an angle of inclination between outer sections 210.1, 210.2 and the middle section 205 is different at a first section A along axis of longitudinal extension of the reaction plate 200 and motor M as compared to another second section B, as illustrated with the two sections A, B shown in FIG. 8, along the axis of longitudinal extension of the reaction plate 200. This allows to vary a horizontally-arranged guiding forces F2H by a mechanical design, such that the lateral guiding forces F2H are smaller with outer sections 210.1, 210.2 having a flatter angle (section A) as compared to outer sections 210.1, 210.2 having a steeper angle (section B). Depending on sections of a rail or track system, for example at sections where there is a curve, stronger guiding forces F2H may be needed, and these could be provided by the steeper angle of outer sections 210.1, 210.2.

The following description corresponds to the description of the above-mentioned co-pending application PCT/CH2021/050026 filed on Dec. 16, 2021 in the name of Swisspod Technologies SA and incorporated in its entirety in the present application. In addition to the description of the said co-pending application, the present application also contains and includes the figures of the co-pending application as detailed hereunder.

Some embodiments of the disclosure are directed to a linear induction motor M with enhanced thrust at high speeds as compared to conventional linear induction motors.

According to one aspect of the present invention, a polyphase linear induction motor is provided. Preferably, the linear induction motor includes a movable primary member, the primary member including a magnetic material and a polyphase winding arranged around the magnetic material, and a stationary longitudinally-extending secondary member separated from the primary member by a gap, the secondary member including an electrically-conductive reaction plate and a backing magnetic material.

Moreover, preferably, an electric conductivity of the electrically-conductive reaction plate is variable along an axis of longitudinal extension of the secondary member.

According to another aspect of the present invention, preferably, a first section at a first location along the longitudinally-extending secondary member that is designed for or intended for a higher relative speed or velocity between the movable primary member and the longitudinally-extending secondary member has a higher resistivity as compared to a second section at a second location along the longitudinally-extending secondary member that is designed for or intended for a lower relative speed or velocity between the movable primary member and the longitudinally-extending secondary member, with the goal to provide for a higher thrust to the primary member when operated at the first section. In other words, for a high intended speed a high effective resistivity is desired, and for low intended speeds a low effective resistivity, or stated another way, high intended speeds signify low conductivity and low speeds high conductivity.

According to yet another aspect of the present invention, a linear induction motor M is provided that includes by a primary member that can generate a working flux that transverses a gap between the primary and secondary member, the working flux cooperating with currents induced in the reaction plate of secondary member of the motor due to the time variation of the flux to produce a propulsive force or thrust. Moreover, according to this proposed structure for the secondary a set of conductive layers lower effective conductivity in the composite conductive reaction plate would result in more flux able to flow in the back yoke. This in turn will result in an increase of the working flux in the gap between the primary and the secondary and in lower end and shielding effects as such presented and described in this disclosure. Moreover, this results in a higher effective thrust when moving at high speeds.

According to still another aspect of the present invention, a stationary longitudinally-extending secondary member of a polyphase linear induction motor is provided. Preferably, the stationary longitudinally-extending secondary member includes an electrically-conductive reaction plate, and a backing magnetic material, wherein an electric conductivity of the electrically-conductive reaction plate is variable along an axis of longitudinal extension of the secondary member.

According to another aspect of the present invention, a polyphase linear induction motor system is provided. Preferably, the polyphase linear induction motor system includes a movable primary member, the primary member including a magnetic material, a polyphase winding arranged around the magnetic material, a stationary longitudinally-extending secondary member separated from the primary member by a gap, the secondary member including an electrically-conductive reaction plate and a backing magnetic material, a power supply including a plurality of power converters, each power converter configured to power at least one winding of the polyphase winding, and a control device for controlling the power supply, the control device preferably configured to control the plurality of power converters of the power supply to generate a moving magnetic field having one or more poles caused by the polyphase winding.

In addition, preferably, the control device is further configured to vary a pole pitch of the moving magnetic field of the polyphase winding by increasing or decreasing a distance between poles of the moving magnetic field caused by the power supply. Preferably, the pole pitch is increased with an increased speed of the primary member.

According to yet another aspect of the present invention, a method of modulating a plurality of power converters is provided, each power converter connected to a winding of a polyphase winding of a primary member of a linear induction motor. Preferably, the method includes a step of generating a moving magnetic field with the plurality of power converters having one or more poles, and a step of changing a pole pitch between the poles as a function of a speed of the primary member of the linear induction motor, wherein the pole pitch is increased with an increased speed of the primary member.

Other embodiments of the disclosure may be characterized as a description for an implementation, control and optimization of the driving of a linear induction machine in a variable pole pitch scheme in connection with the composite conductive reaction plate previously stated. The driving and control can include a power electronic circuitry configured to feed the proper phase in a polyphase machine to a set of giving windings with the primary of the machine. The effective pole pitch of the machine can be adjusted to achieve an optimized speed accounting for the effective conductivity of the secondary reaction plate and the nominal operating frequency of the polyphase induction motor.

In embodiments, the invention concerns a polyphase linear induction motor comprising:

a movable primary member, the primary member including a magnetic material, a polyphase winding arranged around the magnetic material; and a stationary longitudinally-extending secondary member separated from the primary member by a gap, the secondary member including an electrically-conductive reaction plate and a backing magnetic material, wherein an electric conductivity of the electrically-conductive reaction plate is variable along an axis of longitudinal extension of the secondary member.

In embodiments of the invention the electrically-conductive reaction plate includes a variation of the materials used along the axis of longitudinal extension to provide for the variability of the electrical conductivity of the reaction plate.

In embodiments of the invention the electrically-conductive reaction plate includes a plurality of subplates that are arranged next to each other along the axis of longitudinal extension, at least some of the plurality of subplates having a different electric conductivity, to provide for the variability of the electrical conductivity of the reaction plate.

In embodiments of the invention the electrically-conductive reaction plate includes a stack of layers, the first layer and the second layer of the stack of layers made of a different material composition providing for a different electrical conductivity.

In embodiments of the invention a thickness of a first layer of the stack of layers is different from a thickness of a second layer of the stack of layers.

In embodiments of the invention a thickness of at least one of the layers of the stack of layers is variable when measured at different positions along the axis of longitudinal extension, to provide for the variability of the electrical conductivity of the reaction plate by an increased cross-section of at least one of the layers of the stack of layers.

In embodiments of the invention the first layer includes a first substack of layers and the second layer includes a second substack of layers, each layer of the first and second substack of layers having a different thickness.

In embodiments of the invention the variability of the electrical conductivity of the reaction plate along the longitudinal extension is configured to increase a magnetic working magnetic flux when energized with a polyphase current from the polyphase winding of the primary member resulting in an increased thrust force to the primary member.

In embodiments of the invention the backing magnetic material includes a composite magnetic material to sustain a working magnetic flux.

In embodiments of the invention the composite magnetic material includes a layer of elements having a high magnetic permeability embedded in a low-conductivity carrier material.

In embodiments of the invention an electrical conductivity of the electrically-conductive reaction plate is lower at a first section at a first location along the axis of longitudinal extension of the secondary member as compared to a second section at a second location along the axis of longitudinal extension of the secondary member, the first and second locations being different.

In embodiments of the invention the first section of the reaction plate is located at an area designated for a higher relative speed of the movable primary member relative to the secondary member as compared to the second section.

In embodiments the invention concerns a stationary longitudinally-extending secondary member of a polyphase linear induction motor comprising:

an electrically-conductive reaction plate; and a backing magnetic material, wherein an electric conductivity of the electrically-conductive reaction plate is variable along an axis of longitudinal extension of the secondary member.

In embodiments of the invention an electrical conductivity of the electrically-conductive reaction plate is lower at a first section at a first location along the axis of longitudinal extension of the secondary member as compared to a second section at a second location along the axis of longitudinal extension of the secondary member, the first and second locations being different.

In embodiments the invention concerns a polyphase linear induction motor system comprising:

a movable primary member, the primary member including a magnetic material, a polyphase winding arranged around the magnetic material;

a stationary longitudinally-extending secondary member separated from the primary member by a gap, the secondary member including an electrically-conductive reaction plate and a backing magnetic material;

a power supply including a plurality of power converters, each power converter configured to power at least one winding of the polyphase winding;

a control device for controlling the power supply, the control device configured to control the plurality of power converters of the power supply to generate a moving magnetic field having one or more poles caused by the polyphase winding, wherein the control device is further configured to vary a pole pitch of the moving magnetic field of the polyphase winding by increasing or decreasing a distance between poles of the moving magnetic field caused by the power supply.

In embodiments of the invention the control device is configured to increase the pole pitch with an increased relative speed of the primary member relative to the secondary member.

In embodiments of the invention the control device is configured to vary the pole pitch to realize a dissimilar synchronous speed as a function of a relative speed between the movable primary member and the secondary member.

In embodiments of the invention the control device is configured to increase the pole pitch by increasing a number of adjacently-arranged windings of the polyphase winding with a same phase voltage or current.

In embodiments of the invention the pole pitch is varied such that the frequency of the polyphase current or voltage provided by the plurality of power converters of the power supply remains below a certain frequency threshold.

In embodiments the invention concerns a method of modulating a plurality of power converters, each power converter connected to a winging of a polyphase winding of a movable primary member of a linear induction motor M, the method including the steps of:

generating a moving magnetic field with the plurality of power converters having one more poles, and changing a pole pitch between the poles of the moving magnetic field as a function of a speed of the primary member of the linear induction motor M, wherein the pole pitch is increased with an increased speed of the movable primary member.

In embodiments of the invention the step of changing the pole pitch is done such that the frequency of the polyphase current or voltage provided by the plurality of power converters remains below a certain frequency threshold.

The above and other objects, features and advantages of the present invention and the manner of realizing them will become more apparent, and the invention itself will best be understood from a study of the following description with reference to the attached drawings showing some preferred embodiments of the invention.

Some block diagrams in the following figures illustrate the architecture, functionality, and operation of possible implementations of systems, methods and control algorithms according to various embodiments of the present invention. In this regard, some blocks in these flowcharts or block diagrams may represent a module, segment, or portion of control, which comprises one or more blocks for implementing the specified logical function(s). It should also be noted that, in some alternative implementations, the functions noted in the block may occur out of the order noted in the figures. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware.

Figure 9:
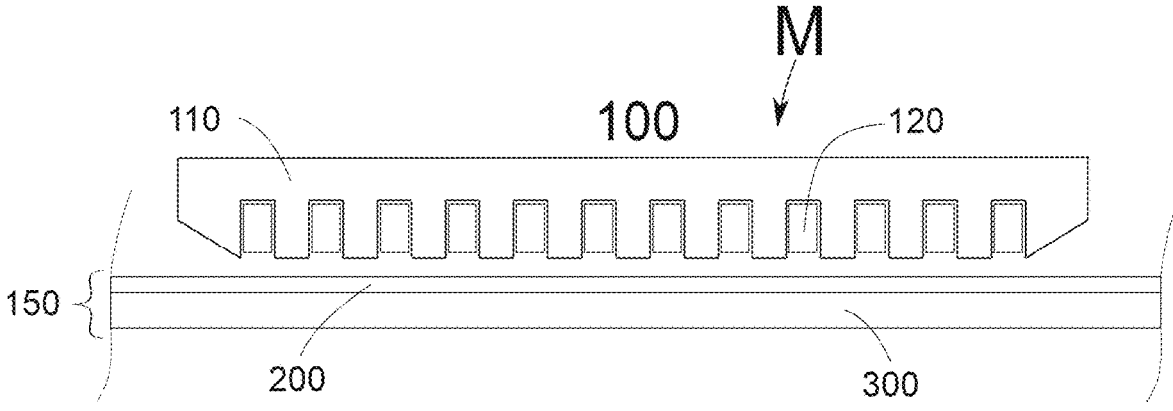
FIG. 9 is an exemplary representation of a side view of a linear induction motor M operating as a single-sided linear induction motor (SLIM) having a movable primary member 100 and a stationary longitudinally-extending secondary member 150, the secondary member 150 having an electrically-conductive reaction plate 200 and a backing magnetic material 300, the conductive reaction plate 200 having different electric conductivities at the different sections along an axis of longitudinal extension of the different stationary longitudinally-extending secondary member 150.

As illustrated in FIG. 9, an exemplary single-sided linear induction motor M is shown with a simplified side view. In this exemplary embodiment, induction motor M includes a primary member 100, the primary member 100 being movable, and including windings 120 and magnetic core 110, a stationary longitudinally-extending secondary member 150, the secondary member including a conductive reaction plate 200 and a backing magnetic material or layer 300, also referred to as the back yoke or mirror iron.

According to an aspect, a structure and configuration of conductive reaction plate 200 is such that it can provide for an increased the thrust to a vehicle or other device that is propulsed by primary member 100 at high speeds. As compared to the state of the art solutions where the electric conductivity of the conductive reaction plate 200 is constant at different locations along a longitudinal axis of extension of the stationary secondary member 150, by contrast according to an aspect of the present invention, the electric conductivity of conductive reaction plate 200 is different at different locations along the stationary longitudinally-extending secondary member 150, based on an intended relative speed or velocity between primary member 100 and secondary member 150 at the specific location of the secondary member 150. For example, at locations along stationary longitudinally-extending secondary member 150 where the primary member 100 is configured or intended to pass at a high speed relative to secondary member 150 the electric conductivity is lower, as compared to locations of the secondary member 150 where the speed of primary member is intended to be lower, where the electric conductivity higher.

Applying this principle to an exemplary situation of a linear induction motor M driven vehicle such as a train powered by a primary member 100 and where a rail includes the secondary member 150, at high-speed sections of the rail where the primary member 100 and vehicle is intended to reach between 400 km/h and 600 km/h relative to the secondary member 150, the conductive reaction plate 200 has a lower electric conductivity as compared to locations where the vehicle is intended for a lower speed, for example at a train station or stop where the intended speeds are between 0 km/h and 100 km/h. In this sense, according to an aspect, the electric conductivity and therefore also the electric resistivity of the electrically-conductive reaction plate 200 is variable along an axis of longitudinal extension of the secondary member 150.

For example, in a variant, an electrical conductivity of the electrically-conductive reaction plate 200 is lower at a first section at a first location along the axis of longitudinal extension of the secondary member 150 as compared to a second section at a second location along the axis of longitudinal extension of the secondary member 150, the first and second locations being different.

In one embodiment, the electrically-conductive reaction plate 200 includes a variation of the materials used along the axis of longitudinal extension to provide for the variability of the electrical conductivity of the reaction plate 200, for example by the use of different conductive materials having different conductivities, for example but not limited to copper, aluminum, iron, or iron-based materials such as stainless steel, or by the use of conductive or non-conductive additive fillers that can be dispersed into the material that forms the electrically-conductive reaction plate 200 to adjust a conductivity thereof. In the context of the present document, the linear induction motor M is described with reference to a single sided induction motor SLIM setup as for example shown in FIG. 9, but the same principles, configurations and designs with respect to the reaction plate 200 also apply to other linear motor configurations, for example the double-sided linear induction motor (DLIM), and other types.

Figure 10:
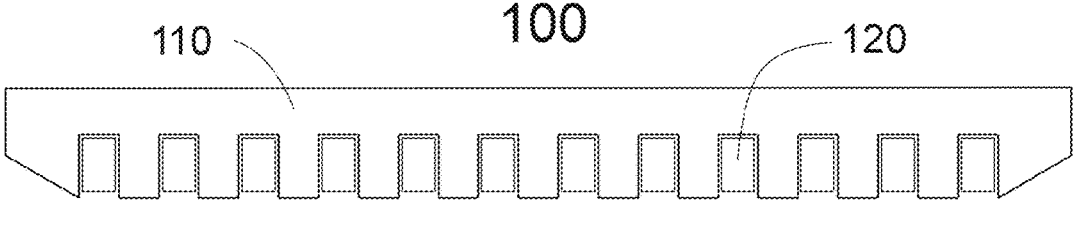
FIG. 10 shows and exemplary representation of a side view of the primary member 100 of the motor M including the magnetic yoke 110 and windings 120.

As shown in the exemplary representation of FIG. 10, a movable primary member 100 is shown as a simplified cross-sectional side view, with the primary member 100 including a magnetic yoke 110 having a plurality of slots, and a polyphase winding 120 having a plurality of stator windings. By no way of limitation, polyphase winding 120 in the stator can be supplied with a polyphase alternating current (AC), for example from one or more power converters. For example, it is possible that a three-phase voltage power converted is used to supply one phase to each winging of polyphase winding 120, but many other configurations are also possible. For illustration purpose, stator windings 120 in cooperation with magnetic yoke 110, could represent a face-wound and multilayer winding or a Gramme style coils spaced longitudinally along the primary member 110. Gramme style coils or Gramme type windings for linear induction motors have been described in the patent publications DE2265049A1 and GB1288985 for example.

An enhancement or increase of the thrust T of linear induction motor M can be achieved at high speeds based on the structure and configuration of conductive reaction plate 200, and by no way of limitation, can be achieved as well using dissimilar arrangements magnetic yoke 110 and polyphase windings 120 as such described in the background art, for example disclosed in U.S. Pat. Nos. 3,585,423 and 3,958,138. However, these background art solutions emphasize the change of thrust-slip characteristics for controlling the speed, given the lack of electronic power converters with variable frequency supply at the time of filing of these patents.

With the polyphase linear induction motor M shown exemplarily in FIGS. 9 and 10, the working flux, being the magnetic flux that transverses the gap between the primary member 100 and the secondary member 150 of motor M cooperates with currents induced in conductive reaction plate 200 of the secondary member 160 of motor M due to the time variation of the flux to produce a propulsive force or thrust T to primary member 100. The magnetic material of both primary member 100 and secondary member 150 lie in transversely planes to the axis of longitudinal extension of motor M to provide in cooperation a low reluctance path for the working flux which is itself oriented transversely to motor M.

Figure 15:
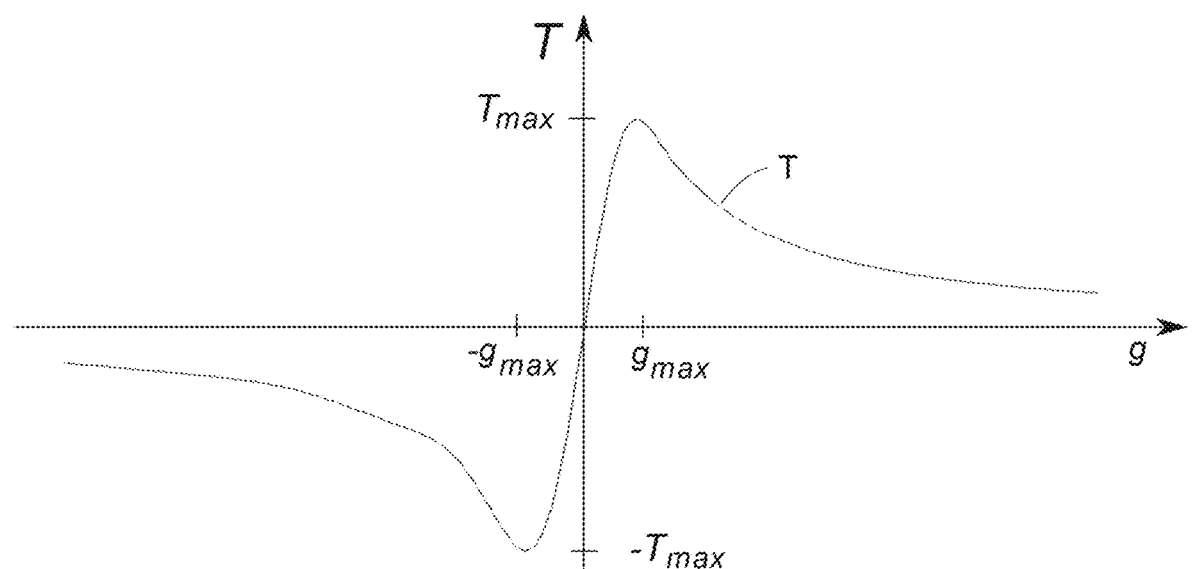
FIG. 15 illustrates a graphical representation of thrust-slip profile as expected for a traditional SLIM, showing the thrust T at the abscissa and the slip g at the ordinate, depicting that the thrust T of a SLIM can decrease notably beyond a maximal slip value gmax, where the mechanical speed of primary member 100 is the slip g multiplied by the synchronous speed.

As illustrated with a graph in FIG. 15, thrust T of a linear induction motor M decreases notably with the increase in the relative speed between primary member 100 and secondary member 150 as a function of the slip g. With a conventional linear induction motor, at high frequencies, which translates into high speeds of primary member 100, the maximum thrust T_max decreases dramatically. With aspects of the present invention, with linear motor M, T_max decreases much less as the frequency and therefore speed increases.

In contrast with a classic rotary induction motor where the primary member generated working flux is continuous and has no beginning or end around its circumference, thus can be considered as infinite, in linear induction motors only that part of the secondary member 150 immediately below the primary member 100 is subjected to a primary generated working flux. Herein, the relative motion between the finite-length movable primary member 100 relative to longitudinally-extended secondary member 150 induces a dynamic end effect by creating end-effect currents in an area of reaction plate 200 closer to primary member 100 that can demagnetize the oncoming end of primary member 100 of motor M. These end effect currents produce additional forces opposing thrust T and cause additional losses that can also exist even at synchronous speed, the synchronous speed being a speed where a speed of traveling magnetic wave induced by the working flux matches or is the same as the relative speed between primary and secondary members 100, 150. See Selcuk et al., "Investigation of End Effects in Linear Induction Motors by Using the Finite-Element Method," in IEEE Transactions on Magnetics, Vol. 44, No. 7, pp. 1791-1795, July 2008, doi: 10.1109/TMAG.2008.918277. Moreover, the effect increases notably with the increase of the relative speed between primary and secondary members 100, 150.

Furthermore, at high relative speeds and in connection to the aforementioned end-effect, the increase of in the effective induced currents in the reaction plate 200 of secondary member 150 of motor M results on a reduction of the working flux in the gap between primary and secondary members 100, 150, with less of the flux able to flow through backing magnetic material 300, for example back yoke or mirror iron 300 and resulting in a decrease of the thrust T that is available. This can be referred as a shielding effect.

With the herein described variably electric conductivity and therefore also variable electric resistivity of conductive reaction plate 200, selectively applied to sections of the secondary member 150 as a function of the intended relative speed or velocity between primary and secondary member 100, 150, it is possible to provide for a polyphase linear induction motor M, to provide for a stationary longitudinally-extending secondary member 150 of a polyphase linear induction motor M, to provide for a method of designing and manufacturing a stationary longitudinally-extending secondary member 150, and a corresponding system thereof, with the goal to provide for an increased thrust at high speeds, as compared to the conventional designs. With the herein proposed configuration of the secondary member 150, due to the electrodynamics, this shielding effect is strongly reduced as the shielding of the field is strongly reduced, thus producing more thrust.

Figure 11:
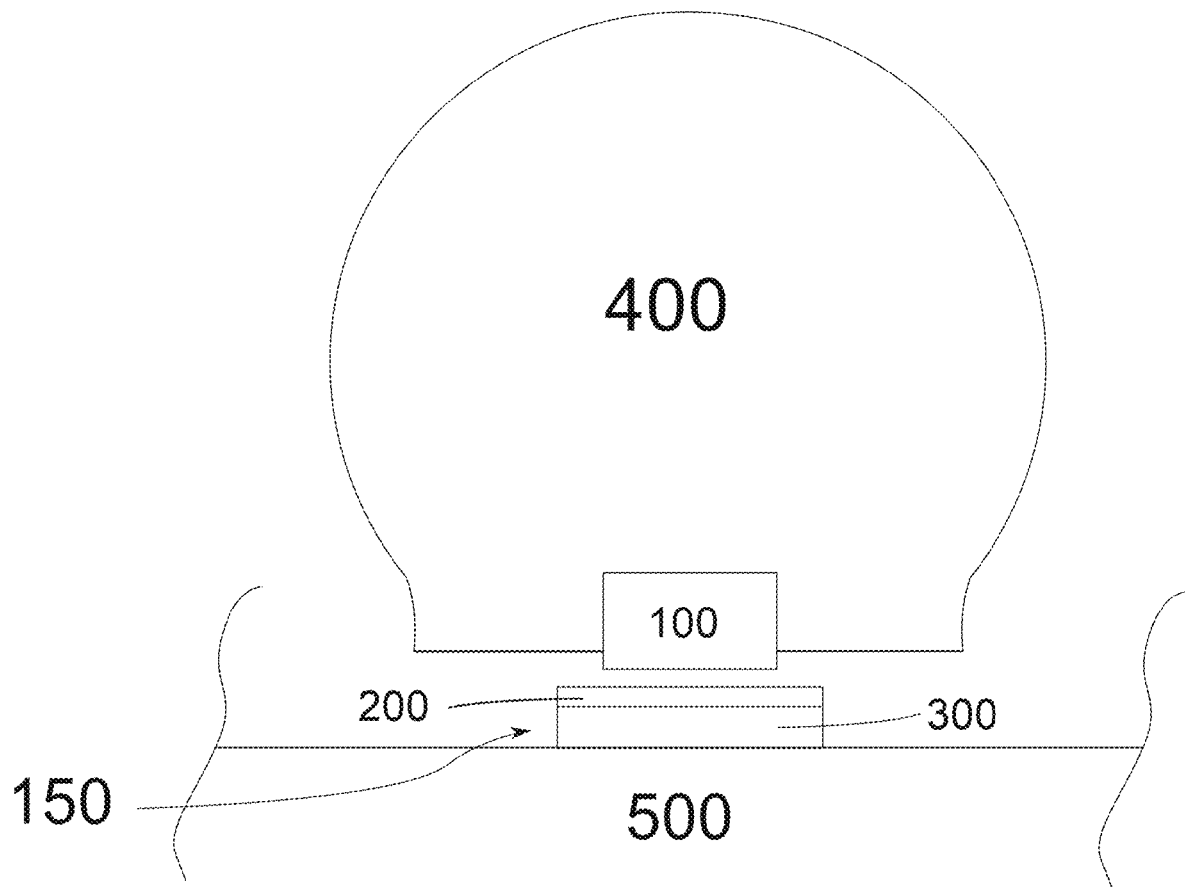
FIG. 11 illustrates an exemplary cross-sectional view of a linear induction motor M as applied to a vehicle 400 viewed in a direction of longitudinal extension of the stationary longitudinally-extending secondary member 150.

By no way of limitation, FIG. 11 shows a simplified cross-sectional view of a general application of an induction motor M in a transportation system, when viewed in a direction of an axis of longitudinal extension of the trackway or rail 500. In the variant shown, primary member 100 of motor M is operatively attached to vehicle 400 whereas secondary member 150 including conductive reaction plate 200 and backing magnetic material attached to a trackway or rail 500. Given that secondary member 150 of the motor M extends the length of the trackway, it constitutes a considerable part of the cost of system as a whole and it is desirable that the structure of secondary member 150 is as simple as possible while still providing the capability for a vehicle to attain high speeds in an energy efficient solution. This is of particular interest, without limitation, to those vehicles intended to operate at high speeds for long distances using onboard finite energy storages, like for example battery systems.

According to an aspect of the present invention, with the herein presented motor M, secondary member 150, and system including the secondary member 150, it is possible to provide for increased thrust independently of a particular or specific configuration of primary member 100. Nonetheless, and in connection to FIGS. 17 and 18, further increased performance can be obtained by selecting a cooperating configuration as later to be described.

Figure 12:
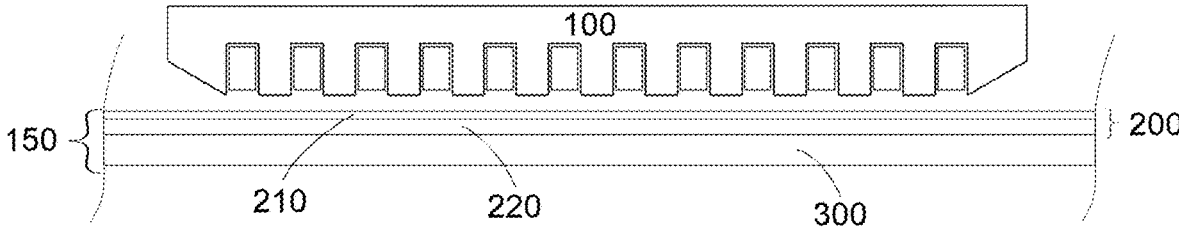
FIG. 12 shows a schematic representation according of an embodiment of a secondary of a linear induction motor M where the electrically-conductive reaction plate 200 includes a stack of layers 210, 220 each layer of the stack of layers 210, 220 having a different electric conductivity.

FIG. 12 shows an exemplary simplified side view of motor M at a specific location, according to an embodiment of the present invention, where conductive plate 200 of the secondary member 150 includes a multi-layer structure or a stack of layers, for example two layers 210 and 220. As an example, a thickness of layer 210 can be different from a thickness of layer 220, while layer 210 and 220 can be made of different material compositions, for example to provide for dissimilar magnetic and electric properties. In a variant, it is possible that a first layer 210 has a first electric conductivity, the second layer 220 has a second electric conductivity, the first and second electric conductivity being different. Accordingly, at different locations along the longitudinal axis of secondary member 150, an electric conductivity can be changed by having different thicknesses of the first and second layer 210, 220.

Figure 13:
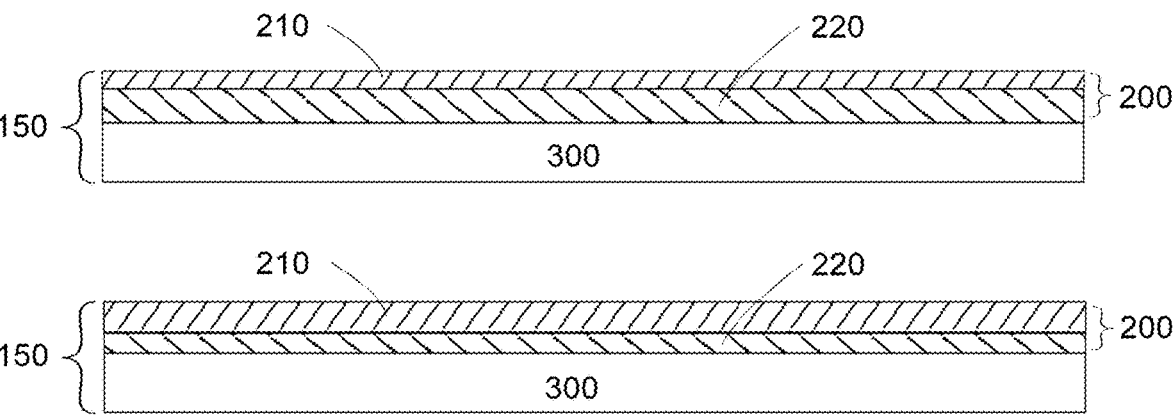
FIG. 13 illustrates two side views of two different sections of the longitudinally-extending secondary member 150 having the electrically-conductive reaction plate 200 including a tack of layers 210, 220, where different sections along the longitudinally-extending secondary member 150 have plates of different thicknesses for adjusting the electric conductivity of the electrically-conductive reaction plate 200 as a function of a location of the section along the longitudinal extension of the secondary member 150.

FIG. 13 shows an exemplary and simplified side view of two different sections A and B of a longitudinally-extending secondary member 150, having a conductive reaction plate 200 made of a first and second layers 210, 220. Each section A and B can be intended for different relative speeds of primary member 100 relative to secondary member 150, where section A has a conductive reaction plate 200 with a different electric conductivity as compared to section B. It is possible that conductive plate 200 has the same thickness for both sections A, B, but for section A, a thickness of second layer 220 is larger than a thickness of second layer 220 at a section B, and conversely the thickness is different for first layer 210, thereby providing for a different electric conductivity at the sections A and B. As an example, a thickness of layer 210 can be inversed with the thickness of layer 220 at the different sections A, B. This allows to alter the conductive part of the secondary member 150 with an efficient and simple design, to thereby change the effective flux. However, it is also possible that the overall thickness of conductive reaction plate 200 is variable along the axis of longitudinal extension. The change in the thickness of the plates or layers 210, 220 shall be interpreted, by no way of limitation, as a configuration to make a composite conductive reaction plate. By way of illustration, only two layers 210, 220 are shown, but there can also be more than two layers that form the conductive reaction plate 200 with different electric conductivities, for example by using different material compositions.

It will therefore be appreciated that by changing the thickness, order and properties of the layers or plates 210, 220, the flux in backing magnetic material 300 can be in turn changed. Moreover, to this configuration of the conductive reaction plate 200, for example a composite conductive reaction plate, a lower effective conductivity would result in the fact that more flux would be able to flow in backing magnetic material 300. This in turn will result in an increase of the working flux in the gap between primary and secondary members 100, 150 and in lower end and shielding effects.

Figure 14:
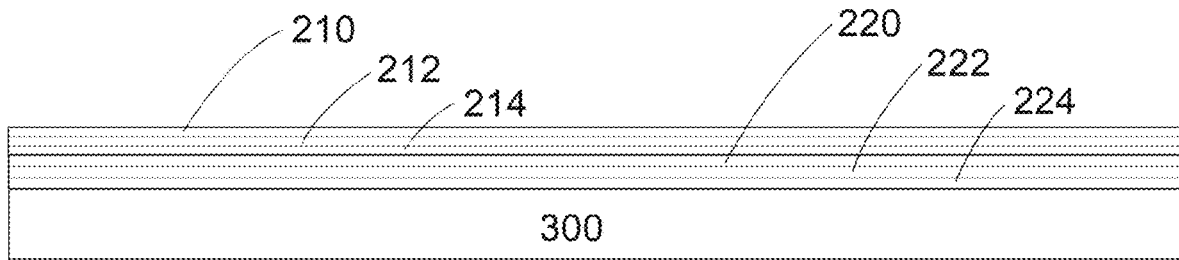
FIG. 14 shows an exemplary side view of an embodiment of the present invention, where each layer 210, 220 of the stack of layers 210, 220 of the reaction plate 200 includes a plurality of laminations or layers 210, 212, 214 and 220, 222, 224, each lamination or layer of the laminations or layers 210, 212, 214 and 220, 222, 224 having preferably a different thickness.

FIG. 14 shows an exemplary and simplified side view of an exemplary longitudinally-extending secondary member 150 that is made of two layers 210, 220, with each layer 210, 220, including a plurality of layers, such that the first layer 210 includes a first substack of layers 212, 214, 216 and the second layer 220 includes a second substack of layers 222, 224, 226, each layer of the first and second substack of layers having a different thicknesses. With this embodiment, the effective conductivity of conductive reaction plate 200, for example a composite conductive reaction plate, can be further tailored by combining thin layers of materials with different electrical properties as for example but not limited to non-magnetic stainless steel, polymer based composite materials, carbon-aluminum alloys, tin, bronze, aluminum, graphite. The effective conductivity of the resulting conductive reaction plate 200 will be then the weighted average of the electric conductivity of the layers, in the variant shown two stacks of three layers 212, 214, 216 and 222, 224, 226, that are included in this section of the conductive plate 200. It will therefore be appreciated that in a design of a linear induction motor M the thrust can be optimized based on this feature each given section or portion of the secondary member 150, at different locations where different intended speeds are required.

As a non-limiting example, the effective conductivity of conductive reaction plate 200 for a vehicle equipped with primary member 100 moving at speeds from 200 km/h to 1300 km/h, reaction plate 200 could exhibit an equivalent resistivity in the range of 2.7\*10^−7 to 7\*10^−6 Ohm\*m, herein considered as a reaction plate 200 for high-speed sections. Similarly, for speeds from 50 km/h to 200 km/h an equivalent resistivity could be in the range of 2.65\*10^−8 to 2.7\*10^−7 Ohm\*m, corresponding to a reaction plate 200 for sections having a medium-speed, and for speeds lower than 50 km/h, exemplary values for the equivalent resistivity of reaction plate 200 could be in the range of 1.68\*10^−8 to 2.65\*10^−8 Ohm\*m, for low speed sections.

Without limitation, the values of the conductivity for each section of reaction plate 200 can be optimized using finite elements modeling simulations that take the results of analytical calculations as input values. The effective conductivity for a reaction plate 200 for a given configuration of the primary member 100 of a motor M1, with a reaction plate 200 intended for low speed operation, said for example a speed v1 of 50 km/h, could be assumed to be high, i.e. it is that one of copper or aluminum, or other highly conductive material. Thereafter, for a high speed section of conductive reaction plate 200, for example at a speed v2, the target effective conductivity sigma2, as a rough approximation, could be expected to decrease proportionally to the ratio of the speeds v1 and v2.

Furthermore, the effective electrical conductivity of a composite reaction plate as represented by layers 212, 214, 216 and 222, 224, 226 in the embodiment in FIG. 14 without limitation, can be understood as the average electrical conductivity of the conductive composite plates 200, and be calculated as follows:

$$\sigma_{eff} = \frac{\sum_{i=1}^{N} \sigma_i \cdot d_i}{d_{tot}}$$

Where N is the total number of conductive layers, $\sigma_i$ is the electrical resistivity of any i—esimal layer within the composite plate, $d_i$ is the thickness of layer, and $d_{tot}$ is the total thickness of the composite plate 200.

Figure 16:
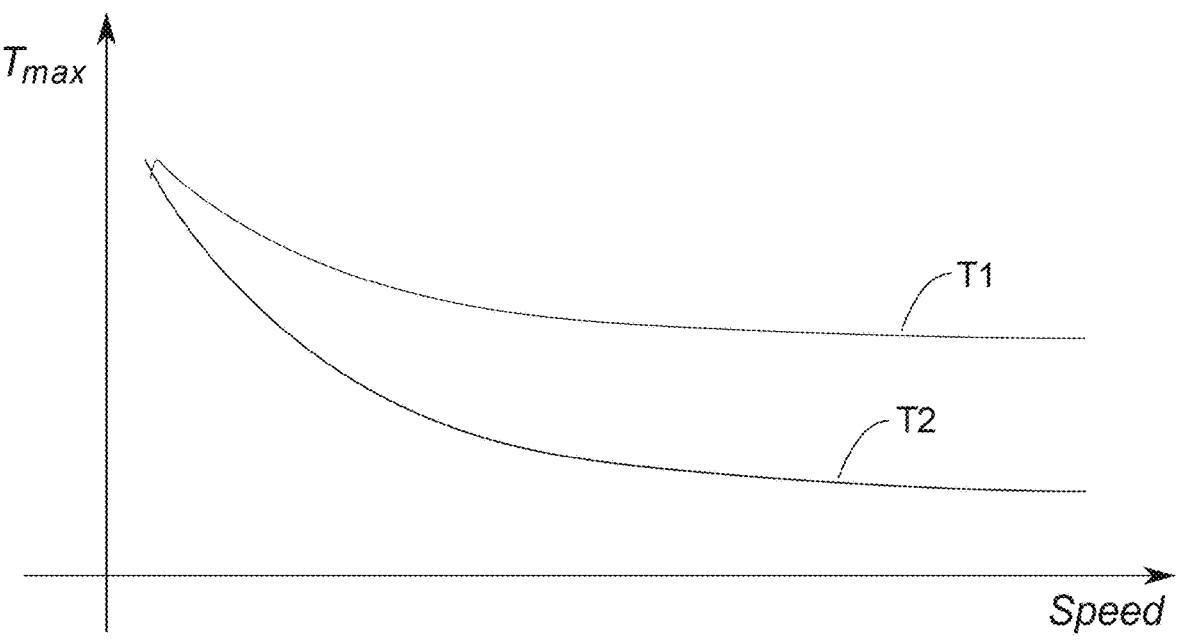
FIG. 16 shows two graphs T1, T2 providing a comparison between the thrust profile T expected for a SLIM according to the state of the art and the thrust profile of motor M according to an aspect of the present invention, as a function of the frequency of the power supply.

FIG. 16 shows two different graphs showing an exemplary thrust T1 generated by a linear induction motor with a single conductive plate according to the state of the art, and an exemplary thrust T2 expected from a linear induction motor M according to the herein described embodiments. For sections that are designed for low intended speeds of primary member 100, or for the first acceleration from zero to a low speed, the low speed exemplified by a low frequency of the power supply that will generate a moving electromagnetic field with primary member 100, to avoid jerk effects caused by motor M, a highly conductive material for reaction plate 200 is desired, as compared to sections where the intended or required speed in substantially higher. In this respect, at sections designed for lower speeds and standstill, a conventional aluminum-based reaction plate 200 can be used, and sections intended for higher speeds, higher-resistivity reaction plates 200 can be selectively used based on the intended speed. As shown with the two graphs T1 representing the thrust of the conventional motor, and T2 representing the thrust of the herein described embodiments of the linear induction motor M, the use of a conductive reaction plate 200 along a trackway of a vehicle propelled by primary member 100, with an adjustment of the electric conductivity along the trackway for maximizing thrust at a speed that would be intended at a given section of the trackway will result in the most effective thrust-speed characteristic. It can be seen that the thrust T2 can be more than twice the thrust generated by the conventional motor.

In contrast to the state of the art, with the herein described embodiments of the invention, the variable electric conductivity of conductive reaction plate 200, for example by employing a composite reaction plate, the thrust performance can be strongly improved or even maximized for motor M with a given speed at a given sector of secondary member 150, in particular at high speeds, without the need to make any specific controls to the power supply 600. Different material compositions, number of layers, thicknesses of layers, and other design aspects can be used to provide for the conductive reaction plate 200, to establish a required effective conductivity of the conductive reaction plate 200 at a given section to attain the maximum thrust-speed ratio.

As aforementioned, the backing magnetic material 300, as for example shown in FIG. 14, is intended to provide in cooperation a low reluctance path for the working flux, where the level of the flux will depend on the end shielding effects resulting from characteristics of conductive reaction plate 200. Backing magnetic material 300 preferably has a high magnetic permeability and a low bulk effective electrical conductivity, to avoid losses by induced eddy currents. As an example, this can be achieved using electrical steel laminations, as described above with respect to the primary member 100 of motor M, or for example by using a low conductivity composite magnetic material. For example, the composite magnetic material can be made of a low-conductivity carrier material having elements embedded therein, the elements having a high magnetic permeability. For example, these elements can be iron pellets, iron fibers, iron particles, iron beads, or a combination thereof, embedded in the carrier material. The carrier material can be concrete, for example a concrete slab. Preferably, the composite magnetic material has a high magnetic permeability, for example a relative magnetic permeability $\mu r=>50$. In correlation with the expected magnetic flux in backing magnetic material 300, the composition, width and structure of backing magnetic material 300 can be optimized attending to the magnitude of the working flux and thus the relative speed of primary member 100 in relation to secondary member 150 of motor M. Given that backing magnetic material 300 is part also of secondary member 150 of motor M and it extends the length of the trackway, it constitutes a considerable part of the cost of a system as a whole and it is desirable it is optimized as much as possible to reduce costs of the elements used while still providing the capability for a vehicle powered by primary member 100 to attain high speeds in an energy efficient solution.

Figure 17:
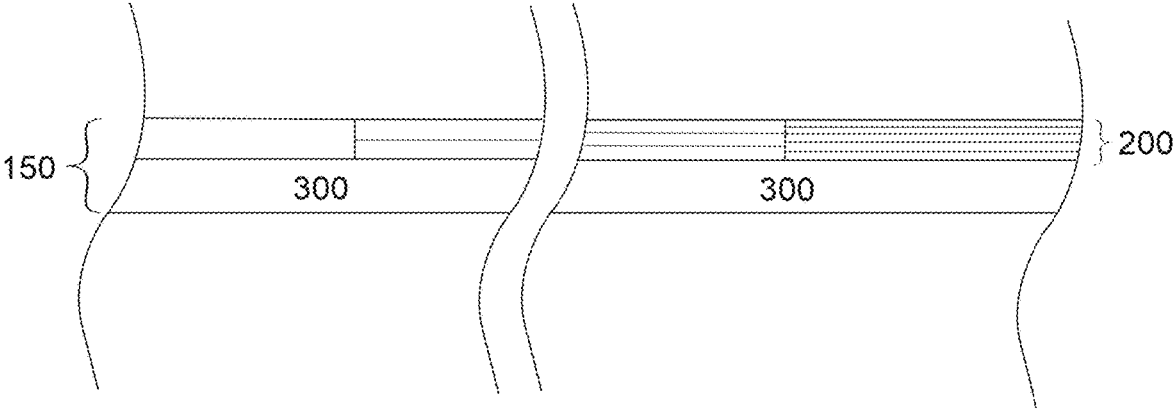
FIG. 17 shows an exemplary side view of an embodiment where the electrically-conductive reaction plate 200 includes different side plates that are arranged next to each other, the side plates providing for different electric conductivity at different sections, for example by having different thicknesses, using a material with different electric conductivities, or both.

FIG. 17 shows an exemplary side view of an embodiment where the electrically-conductive reaction plate 200 includes different side plates that are arranged next to each other, the side plates providing for different electric conductivity at different sections. For example, the electrically-conductive reaction plate 200 can includes a plurality of subplates that are arranged next to each other along the axis of longitudinal extension, at least some of the plurality of subplates having a different electric conductivity, to provide for the variability of the electrical conductivity of the reaction plate 200. In a variant, the different subplates that are arranged next to each other can have a variable thickness when seen a different sections along the axis of longitudinal extension, for example by the use of adjacently arranged plates having different thicknesses. In a variant, the aspects of subplates arranged side-by-side have different thicknesses and also different electric conductivity.

Next, different non-limiting examples for the application of the electrically-conductive reaction plate 200 with the variable electric conductivity is provided, with the goal to provide for an improved or even maximized thrust-speed profile.

Figure 18A:
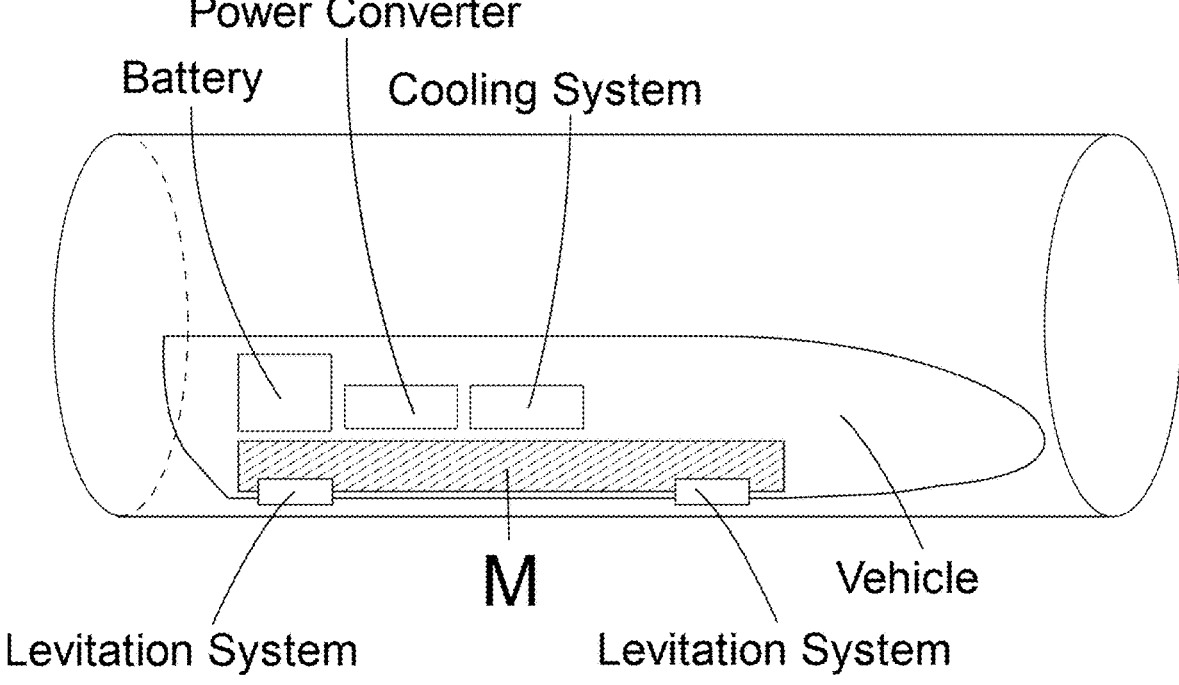
FIGS. 18A and 18B show aspects of an example of an application of the herein described linear induction motor M and the conductive reaction plate 200, with FIG. 18A showing an exemplary system and FIG. 18B showing graphs of exemplary thrust values that can be achieved for a machine A using the conventional linear motor, and a machine B using the herein described principles and embodiments.

For non-limiting example, as illustrated with FIG. 18A with a simplified non-limiting example, a transport capsule as vehicle 500 using a linear induction motor as a propulsion can be considered, intended to travel at speeds beyond 1200 km/h. Transport capsule is relatively light (less than 100 tons), is configured to transport passengers over a rail that is equipped with secondary member of linear induction motor, in addition using magnetic levitation. The transport is configured to travel from point A to B, and starts at rest at point A, then accelerates up to 1000 km/h or more to reach cruising speed and then decelerates to reach the destination at point B to come to rest. As exemplary parameters for this travel from point A to point B, the required accelerating thrust could be in the order of magnitude of 30 kN to 41 kN and for the cruising speed around 10 kN at 1000 km/h.

Figure 18B:
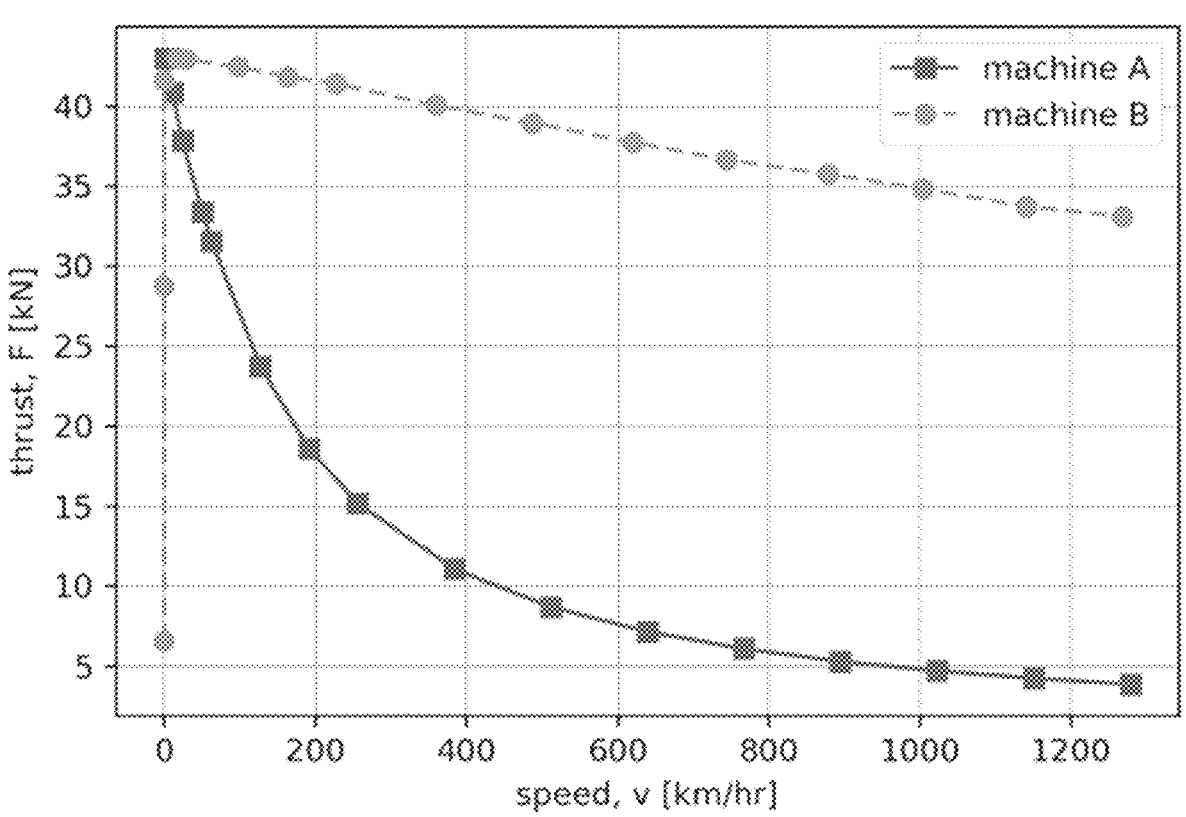

FIG. 18B shows two exemplary graphs comparing the available thrust as a function of speed, with the dark graph ("machine A") showing the thrust hat is theoretically available with a conventional linear induction motor, for example using solid aluminum as a conductive reaction plate, and the lighter graph ("machine B") at the top showing the thrust hat is available with the herein-presented linear induction motor M, using a conductive reaction plate 200 that is adapted in resistivity as a function of the intended speed of transport capsule. It can be seen that the thrust T1 generated by the conventionally designed linear induction motor M cannot provide for the minimally required thrust values for the travel specification given above.

Figure 19A:
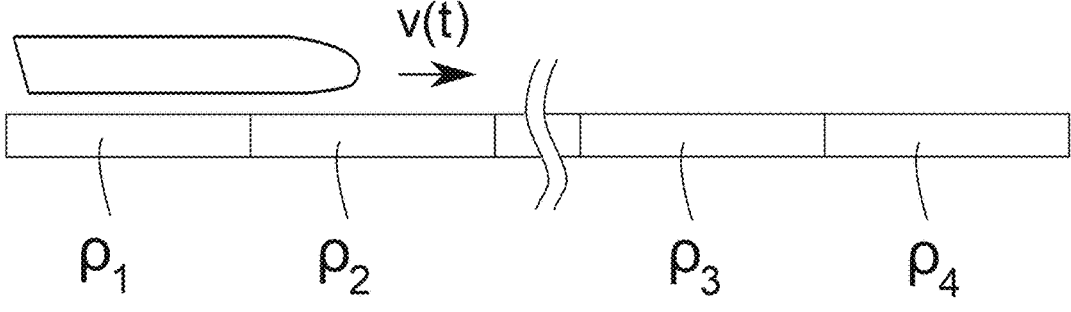
FIGS. 19A to 19C show aspects of an example of an application of the herein described linear induction motor M and the conductive reaction plate 200, with FIG. 19A showing a linear induction motor M based spacecraft SC launch system, or other type of linear accelerator system, configured to accelerate a vehicle or device to high velocity, for example a space escape velocity from earth, and showing a schematic representation of a conductive reaction plate 200 with an increased resistivity with increased speed.

As another non-limiting example, and for the purpose of illustrating the application of a linear-type accelerator device, for example a linear accelerator device for propelling an object to replace fuel-based rocket propulsion, a linear induction motor M could theoretically be used as launch system for propelling a spacecraft SC to an escape velocity from earth that is situated around 40,000 km/h, as schematically illustrated with FIG. 19A. Specifically, a vertically-arranged track or obliquely arranged track with a steep angle as a launch tower equipped with a secondary member 150 having a certain length could be used, with the linear induction motor based system for spacecraft SC equipped with the primary member 100, configured to engage with secondary member 150. Other types of linear launch systems could be developed. To achieve these very high speeds, conductive reaction plate 200 of secondary member 150 of motor M, arranged at the track of the launch tower, can be made according to the aspects and principles of the embodiments of the present invention. For example, changes in properties of secondary member 150 of motor M along the trajectory of the launch tower would have to be such to allow for operation at a reasonable magnetic Reynolds number.

It has been shown that the performance of a linear induction motor M decreases as the magnetic Reynolds number increases. A method to address this problem would be the use of the principles and embodiments of the herein presented invention. As discussed above, the basic idea would be to have an increasingly more resistive reaction plate 200 of secondary member 150 at sections designed for higher speeds to be able to reach the very high-end speed or velocity, this can be done by providing a conductive reaction plate with solid layers of a given material or several composite layers of different materials to reach the desired equivalent resistivity. To achieve an exemplary 40,000 km/h, it would be possible to have a track at the vertical or obliquely-slanted launch tower that has a secondary member 150 that changes the resistivity along the trajectory, this is shown schematically in FIG. 19A. The key is that conductive reaction plate 200 becomes more resistive as the speed increases.

One option would be that the secondary member 150 has four different sections arranged next to each other along a longitudinal extension, with a first section for lower in speeds made of aluminum, then a second section for a first lower middle speed made from stainless steel, or a composite having a high proportion of stainless steel, then then a third section for a second upper middle speed made from graphite, arranged to be parallel to basal plane, and finally a forth section at the end of the launch tower made of graphite, perpendicular to basal plane. In this respect, the effective resistivity of the four different sections follow the following equation:

$$\rho_1 < \rho_2 < \cdots \rho_{N-1} < \rho_N$$

The effective resistivity of the final, forth section of the conductive reaction plate 200 will be approximatively in the order of magnitude of $\rho = 3 \cdot 10^{-5} \, \Omega \cdot m$.

Figure 19B:
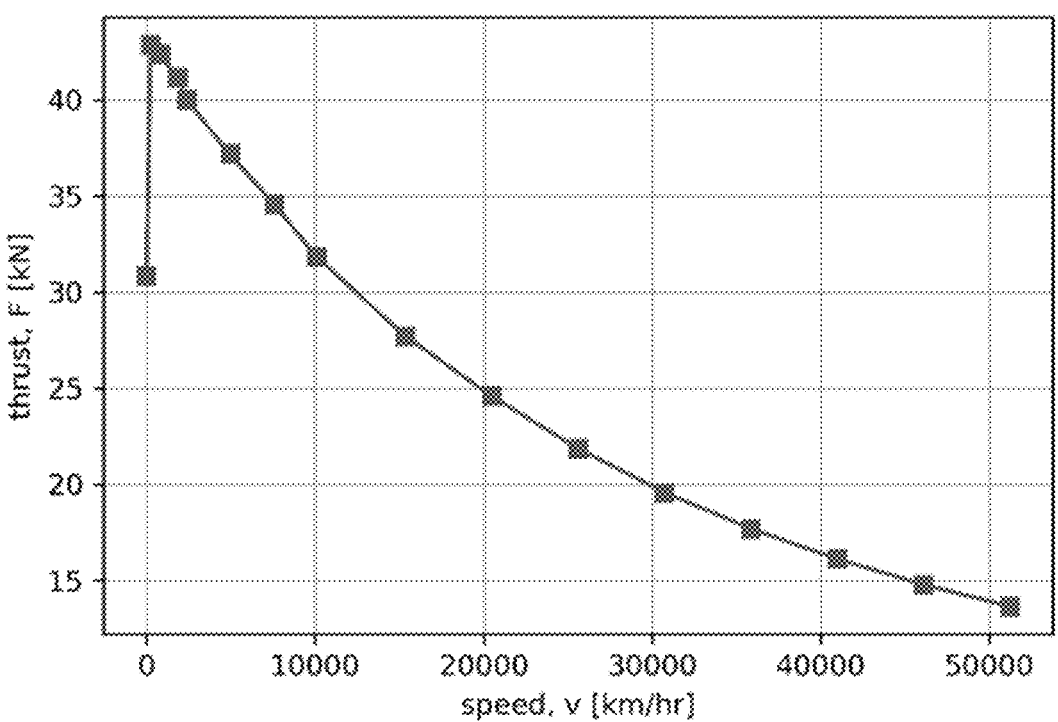
Figure 19C:
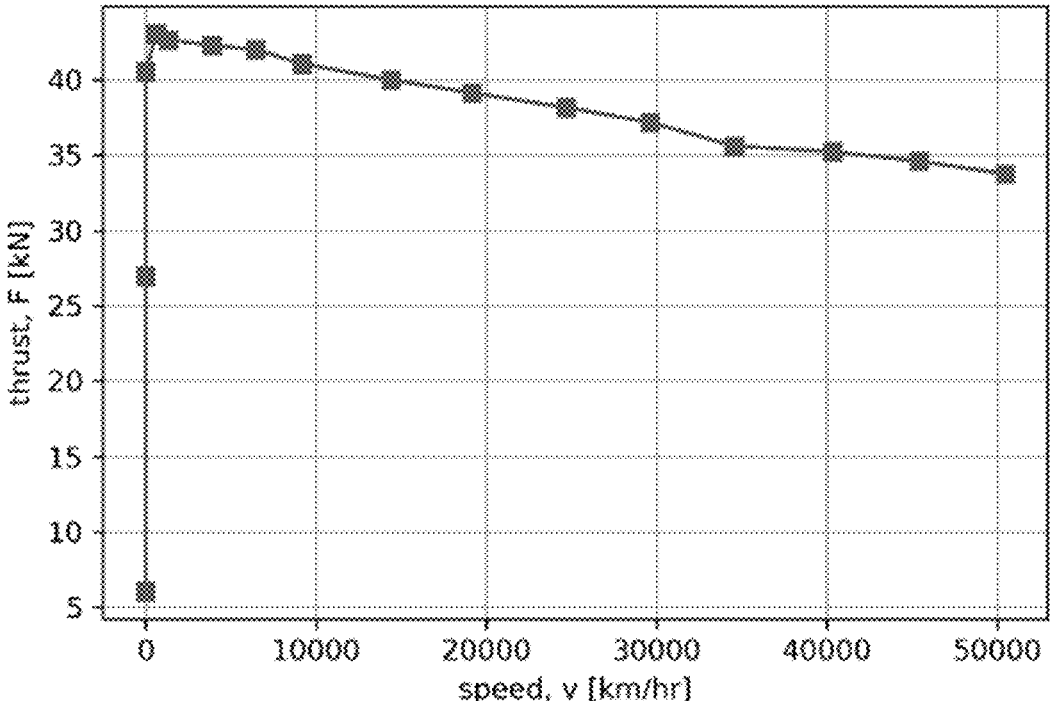

FIGS. 19B and 19C show two graphs illustrating the maximum thrust T as a function of speed for a graphite parallel to the basal plane ($\rho = 5 \cdot 10^{-6} \, \Omega \cdot m$) shown in FIG. 19B, and a composite graphite ($\rho = 3 \cdot 10^{-5} \, \Omega \cdot m$) shown in FIG. 19C. As can be seen from FIG. 19B, the thrust decreases strongly with increased speeds, to start at 44 kN dropping to below 14 kN, while with the graph of FIG. 19C, the decrease of thrust is from 44 kN to about 33 kN. The exemplary motor M used for these simulation results has a pole pitch of 365 mm, and this value could be further optimized for improved performance.

Figure 20:
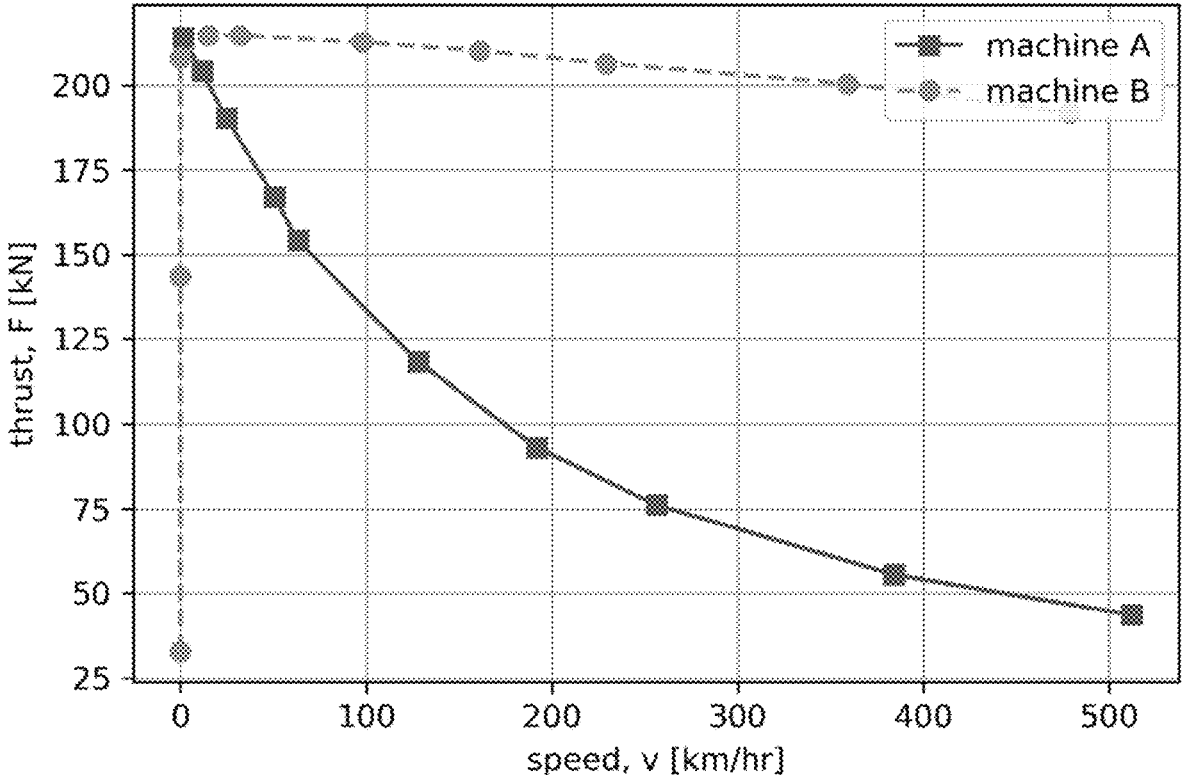
FIG. 20 shows a graph showing two different thrusts as a function of speed with for conventional linear induction motor and a linear induction motor M as described herein, for an exemplary high-speed train application with two different machines A, B.

As another non-limited example for the use of the herein presented embodiments of the invention could be the application to a high-speed train. For example, the high-speed train could be used to transport passengers travelling over a rail, using conventional wheels, travelling from point A to B. The vehicle starts at rest at point A, then accelerates up to 500 km/h of cruising speed and then decelerates to reach the destination at point B. The required accelerating thrust can be in the order of magnitude of 190 kN to 220 kN and the cruising around 75 kN at 500 km/hr. FIG. 20 shows a graph showing two different thrusts T1, T2 as a function of speed with a conventional linear induction motor (machine A) for example one using an aluminum reaction plate, as compared to one according to the principles of the embodiments of the present invention, having a reaction plate 200 with an electric conductivity adjusted for the specific speed (machine B). Note that there can be one primary member 100 in the high-speed train or several smaller primary members 100 distributed in different carriages or sections of the train.

Figures 21, 22A:
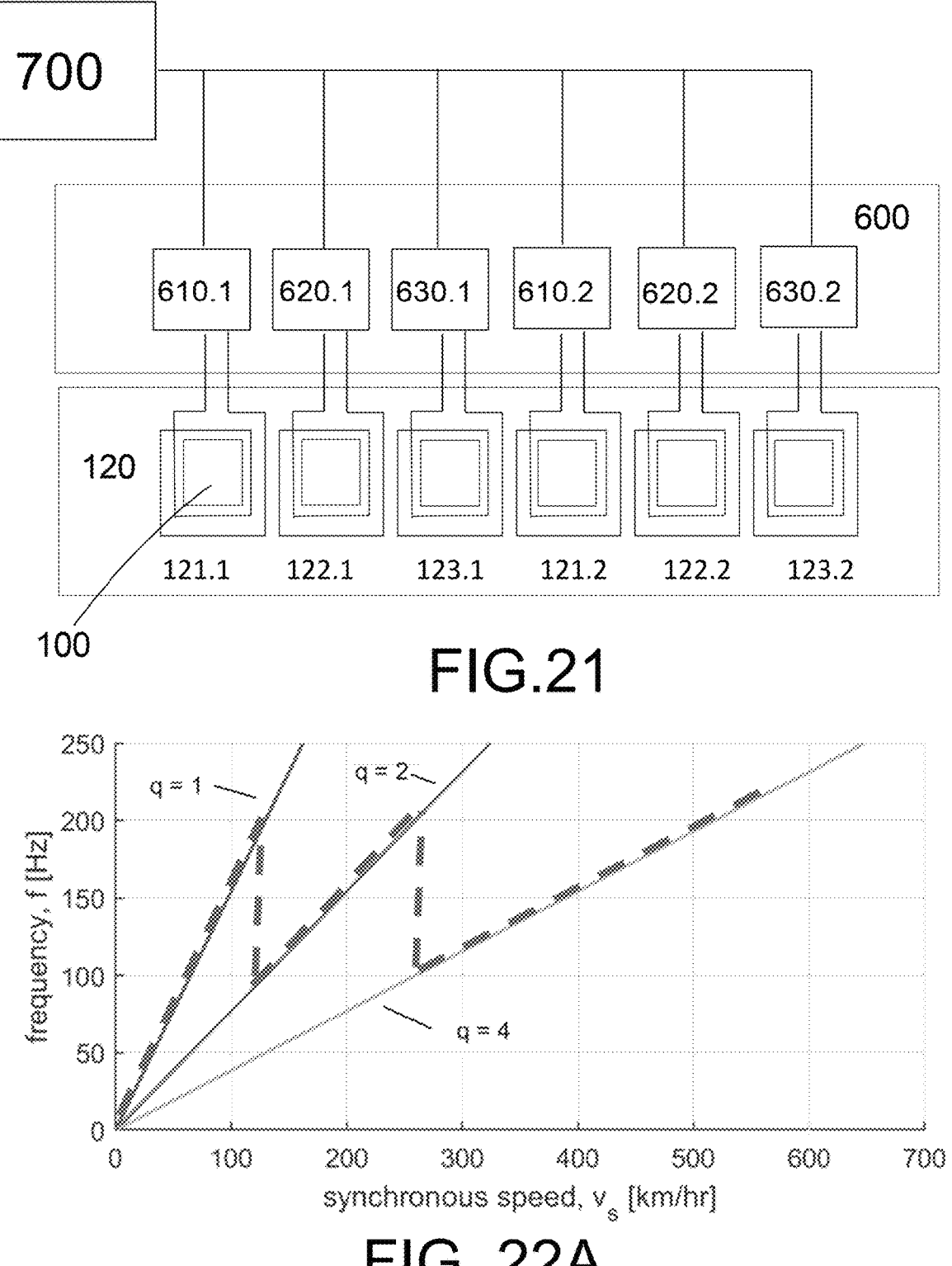
FIG. 21 shows a simplified schematic view of a power converter system S and linear induction motor M, with a primary member 100 with a controller or control device 700, a power supply 600 having two (2) exemplary series of power electronic converters 610, 620, 630, each power electronic converter 610, 620, 630 connected to a winding 121, 122, 123, respectively, system S permitting the application of a variable pole pitch between the poles of the traveling electromagnetic field.
FIGS. 22A to 22B show different graphs representing aspects of the variable pole pitch applied to a linear induction motor M, with FIG. 22A showing a graph with the frequency of the movable magnetic field as a function of the synchronous speed Vs; with the application of an increased pole pitch with an increased speed, and FIG. 22B showing graphs visualizing two different electromagnetic fields based on two different pole pitches, with the example of a movable primary member 100 having 48 slots.

According to another aspect of the present invention, as exemplarily illustrated with a first embodiment in FIG. 21, a polyphase linear induction motor M is provided that can be controlled to vary the pole pitch as a function of a relative speed or velocity between the movable primary member 100 and the stationary secondary member 150.

Preferably, for a given linear induction motor that has a fixed number of physical magnetic poles, the pole pitch of the movable magnetic field can be varied electronically by the use of the power supply, for example a power supply that includes a plurality of monophase power converters that are each connected to a winding of a polyphase winding.

For example, as illustrated in FIG. 21, a polyphase linear induction motor system S can be provided, including a movable primary member 100, movable primary member 100 including a magnetic material 110, a polyphase winding 120 arranged around the magnetic material 110, the polyphase winding 120 including a plurality of windings 121, 122, 123, for example in a Gramme configuration, a stationary longitudinally-extending secondary member 150 separated from the primary member 100 by a gap, stationary secondary member 150 including an electrically-conductive reaction plate 200 and a backing magnetic material 300, a power supply 600 including a plurality of power converters 610, 620, 630, each power converter 610, 620, 630 configured to power at least one winding 121, 122, 123 of the polyphase winding 120.

Moreover, a control device 700 is provided for controlling the power supply 600, the control device 700 configured to control the plurality of power converters 610, 620, 630 of the power supply 600 to generate a moving magnetic field having one or more poles caused by the polyphase winding 120, control device 700 further configured to vary a pole pitch of the moving magnetic field of the polyphase winding 120.

Generally, in a linear induction motor energized from a balanced polyphase source, for example power supply 600, the maximum theoretical speed that at which primary member 100 can move in relation to the secondary member 150 corresponds to the synchronous speed which is given as:

$$v_s = 2\tau_p f_s$$

Where $v_s$ is the synchronous speed of the linear motor, $\tau_p$ is the pole pitch and $f_s$ is the frequency of power supply 600, for example a polyphase voltage supplied to polyphase windings 120. Herein, it can be understood that the synchronous speed of motor M can be increased by either increasing the frequency of the polyphase current, polyphase voltage, and/or the pole pitch of in movable primary member 100 of motor, being the stator.

With the exemplary and simplified embodiment in FIG. 21, a power supply 600 is shown with one monophase power converter 610, 620, 630 is operatively connected to one coil or winding 121, 122, 123, respectively, showing to groups. In the non-limiting example shown, there are six monophase power converters converter 610.1, 620.1, 630.1, 610.2, 620.2, and 630.2, each connected to a single coil or winding 121.1, 122.1, 123.1, 121.2, 122.2, and 123.2, respectively that can be powered by an exemplary three-phase voltage or current, for example a three-phase quasi-sinusoidal voltage with voltages V1, V2, V3. In the polyphase stator, in the context of the present description the movable primary member 100, a pole is given by the plurality of contiguous coils or winding 121, 122, 123 of a polyphase winding 120 operating at the same phase in a same direction of instantaneous current or voltage direction. Herein, the distance between poles is considered the pole pitch $\tau$.

A first, smaller pole pitch can be generated with a smaller value of slots per pole per phase of q=1 can be generated with the polyphase electromagnetic field by power supply 600 by operating three adjacently arranged power converter 610.1, 620.1, 630.1 and the next three adjacently arranged power converter 610.2, 620.2, 630.2 as a three-phase system with a given frequency, choosing a three-phase modulation generated by controller 700. To increase the pole pitch by the factor two (2) with q=2, next, groups of two (2) adjacently arranged power converters are put together and are modulated with the same signal such that each group is in phase, for example such that a first group of power converters 610.1 and 620.1 is modulated by a first signal, a second group of power converters 630.1 and 610.2 is modulated by a second signal, and a third group of power converters 620.2 and 620.3 is modulated by a third signal, the first, second and third signal being a three-phase modulation signal. Thereby, a same voltage V1 is applied to two adjacent windings 121.1, 122.1, a same voltage V2 is applied to two adjacent windings 123.1 and 121.2, and a same voltage V3 is applied to two adjacent windings 123.2. The polyphase electromagnetic wave can thereby have the same given frequency, but with a doubling of the pole pitch. Given the equation above, this leads to a doubling of the synchronous speed vs. In other words, the frequency of polyphase magnetic wave generated by power supply 600 can be halved to maintain the same speed vs, if the pole pitch has been doubled.

As indicated above, the frequency of the polyphase magnetic wave generated by power supply 600, for example a voltage or a current, as a function of the synchronous speed, is shown in the graphs of FIG. 22A for an exemplary three (3) different pole-pitch configurations. The dashed line illustrates the possible trajectory that this machine could follow during operation, the aim is to maximize the time operating with a frequency between 100 Hz and 200 Hz, to avoid high switching losses from the different power converters 610, 620, 630 of the power supply 600. For example, monophase power converters 610, 620, 630, etc. could be optimized to have lowest switching losses for switching frequencies that generate the power supply 600, when generating a polyphase voltage or current to feed the different windings of polyphase winding 120.

Therefore, generally speaking, the pole pitch of system S can be varied such that the frequency of the polyphase current or voltage provided by the plurality of power converters 610, 620, 630 of power supply 600 remains below a certain frequency threshold, for example 200 Hz. The operating philosophy could be further summarized as follows: the operation starts with the maximum possible number of poles (q=1, first line from the left) and when the speed reaches the point where the frequency is 200 Hz, then the power converters 612, 614, 616 of power supply 600 provide for a polyphase voltage or current having a frequency that transforms the machine into a q=2 (second line from the left). The same is done from q=2 to q=4 (third line from the left). This example is directed to a polyphase voltage or current of a three-phase system, it is also possible to modify the number of phases to have an even more flexible operation mode.

According to another aspect of the present invention, a linear induction motor system S, a control device 700 for controlling a linear induction motor M, or a method of modulating power converters for a linear induction motor M is provided, in which the pole pitch of the moving magnetic field is variable as a function of the relative speed of the movable primary member 100 with respect to the secondary member 150. For example, in connection with the intended high-speed linear induction motor as herein presented, for example the motor M, and other types of linear induction motors, a driving of the linear induction motor M in a variable pole pitch scheme can be provided in connection with the conductive reaction plate 200 having a variable resistance is provided.

Figure 22B:
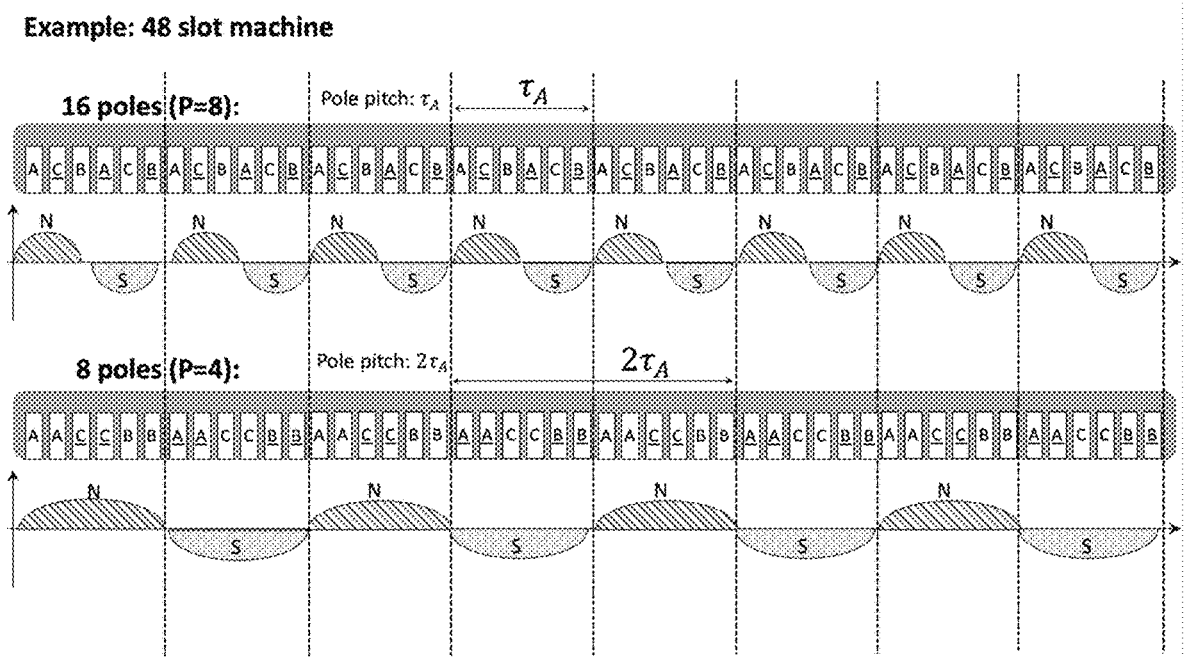

FIG. 22B shows an illustration of two different pole pitches, that can be generated by an exemplary linear induction motor M and power supply 600 for explaining the principle of operation of the variable pole pitch strategy, with a primary member 100 having an exemplary 48 slots, powered by a three-phase voltage or current system with phases A, B, and C. The upper drawing shows a first situation where each adjacent winding or coil is powered by a different phase A, B, or C, having an original pole pitch. The lower drawing shows a second situation where two adjacently arranged coils or windings are powered by the same phase A, B or C, leading to a doubling of the pole pitch, and reducing the number of poles by a factor 2. A third situation could be (not illustrated) where three adjacently arranged coils or windings are powered by the same phase A, B or C, leading to a quadrupling of the original pole pitch, and a reduction of the number of poles by a factor 4.

Figure 23:
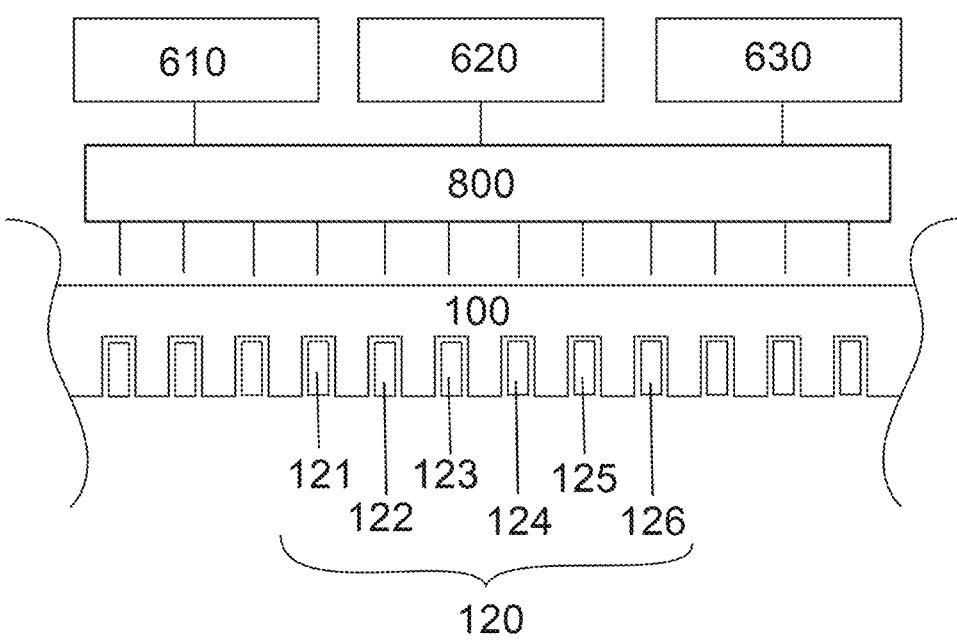
FIG. 23 shows a side view of a simplified schematic of another embodiment of an exemplary system S for providing a motor M with a power that allows to generate a variable pole pitch of motor M.

A second embodiment of a linear motor M or linear motor system S is exemplary shown in FIG. 23, configured to vary a pole pitch of the moving polyphase magnetic field, by the use of a switch box 800, or other type of switching device that allows to selectively interconnect exemplary three (3) different power electronic converters 610 to one or more windings or coils 121, 122, 123 of the polyphase winding 120. In the side view of FIG. 15, a section of a polyphase movable primary member 100 with windings 120 is represented. This section, without limitation, can be understood as any given section of the primary member 100 in a motor M with a plurality of poles. The supply pf the polyphase current or voltage, and driving of the motor M, can be provided by using a plurality of power converters 610, 620, 630 that are controlled by a controller device 700, power converters in operative interconnection to the windings of primary member 100 via a power control and switching box 800. Power control and switching box can selectively connect a specific power converter 610, 620, 630 to one or more windings of the polyphase windings 120. For example, and for non-limiting illustration purposes, power converters 610, 620, 630 could be configured to provide for a three-phase quasi-sinusoidal voltage with voltages V1, V2, V3, one voltage phase per converter 610, 620, 630, the quasi-sinusoidal voltages V1, V2, V3 having a given frequency. Next, we can consider for exemplary purposes that there are six individual windings 121, 122, 123, 124, 125, 126 consecutively arranged next to or adjacent to each other, to form polyphase windings 120.

At a first configuration of switch box 800, switch box 800 could be instructed by a control device 700 to provide first voltage V1 to first winding 121 and fourth winding 124 of polyphase winding 120, second voltage V2 is applied to second winding 122 and fifth winding 125, and third voltage V3 to a third winding 123 and a sixth winding 126. This configuration generates a pole pitch covering three windings of motor M. Next, the pole pitch could be doubled, for example because the speed or velocity of primary member 100 has increased above a certain threshold, or because the frequency of three-phase quasi-sinusoidal voltages V1, V2, V3 have increased above a certain defined threshold, for example but not limited to 200 Hz. At this stage, switch box 800 could be instructed by control device 700 to switch to second configuration, where first voltage V1 is applied to both the first and second winding 121, 122, the second voltage V2 is applied to both the third and fourth winding 123, 124, and the third voltage V3 is applied to both the fifth and sixth winding 125, 126. This means that two adjacent windings pairs 121 plus 122, 123 plus 124, and 125 plus 126 are arranged in parallel, and these pairs now share the magnetization of the core together. As a result, this doubles the length of the pole pitch. Additional windings and configurations would be possible, to again change the pole pitch, for example to triple the pole pitch from the first configuration with the use of parallelly-switched triplets of windings, 121/122/123, etc. The use of a plurality of power converters in this embodiment does not constitute a limitation to such a case when a singular controller is used and interfaced to primary member 100 through the power control and switch box 600. It should be understood that the embodiment illustrates the architecture, functionality, and operation of possible implementations such control and driving system.

Figure 24:
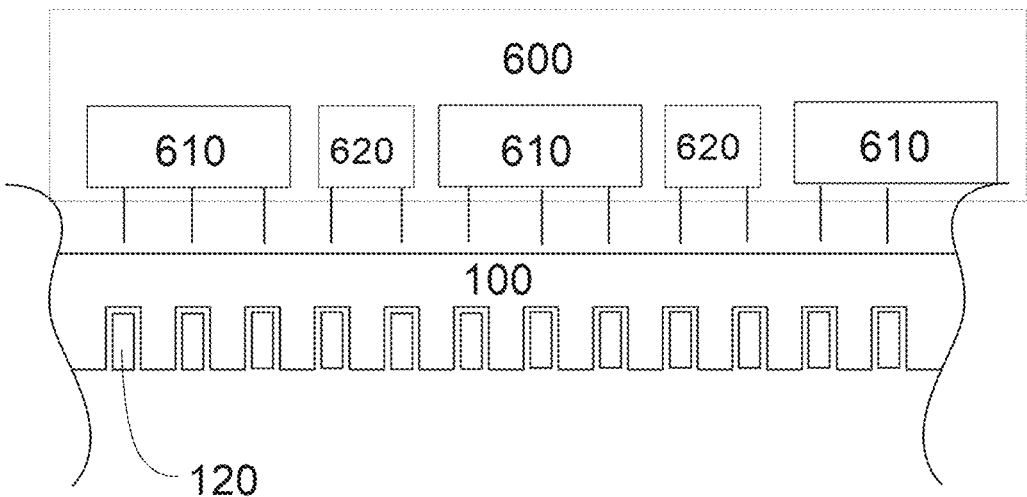
FIG. 24 shows a side view of a simplified schematic of another exemplary system S for providing a motor M with a power that allows to generate a variable pole pitch of motor M.

FIG. 24 shows another variant, where the power control and switch box 600 could contain a plurality of modules 610 to provide a given number of coils within a pole winding with the same current phase as supplied by a controller and a plurality of modules 620 that can provide a dissimilar phase to contiguous coils creating a split or adjoint cooperation of the coils to a given pole. This allows to operate motor M in a variable pole pitch configuration without any physical change to the windings or physical configuration of the primary member 100. It is understood that the total amount of coils and slots in a primary member 100 of a given motor M match the multiplicity required for the herein described operation.

In an exemplary operation of the machine, the thrust versus speed relationship can be further adjusted in connection with conductive reaction plate 200 having a variable resistance as previously described by changing the pole pitch of the applied by the primary member 100 of the motor M as mentioned before. This allows for an optimal establishment of a thrust profile, in particular at high speeds. In conventional linear induction motors, the pole pitch is fixed, so it is necessary to change the electrical frequency to change the speed. According to an aspect of the present invention, with the herein described system S, powering of linear motor M and modulation method, it is possible to add an additional degree of freedom to operate motor M in an optimum way by varying the pole pitch, where an operator can change the pole pitch as well as the frequency to achieve a better performance.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A polyphase linear induction motor comprising:
a movable primary member (100), the primary member (100) including a magnetic material (110), a polyphase winding (120) arranged around the magnetic material; and
a stationary longitudinally-extending secondary member (150) separated from the primary member (100) by a controlled gap, the secondary member (150) including an electrically-conductive reaction plate (200) and a backing magnetic material (300),
wherein the electrically-conductive reaction plate (200) includes a middle section (205) and two outer sections (210.1, 210.2) having an increased electric conductivity as compared to an electric conductivity of the middle section (205) wherein at least one winding of the polyphase winding (120) of the movable primary member (100) includes windings arranged to support the operation of the primary member in a trapezoidal shape; and
wherein an angle of inclination between the outer sections (210.1, 210.2) and the middle section (205) is different at a first section and a second section along the axis of longitudinal extension of the reaction plate (200), the first section being located at a different location than the second section.

2. The polyphase linear induction motor according to claim 1, wherein the magnetic material (110) of the movable primary member (100) includes a middle section (130) and two outer sections (140.1, 140.2), the middle section (130)

and the two outer sections (140.1, 140.2) facing the middle section (205) and the two outer sections (210.1, 210.2) of the reaction plate (200), respectively, via a gap.

3. The polyphase linear induction motor according to claim 2, wherein a cross-sectional shape of the magnetic material (110) of the movable primary member (100) has a trapezoidal shape, when viewed in a direction of the axis of longitudinal extension, with surfaces of the two outer sections (140.1, 140.2) forming side legs of the trapezoidal shape, wherein the angle of inclination between the two outer sections (140.1, 140.2) and the middle section (130) of the movable primary member (100) are oblique when viewed in a direction of the axis of longitudinal extension.

4. The polyphase linear induction motor according to claim 2, wherein the two outer sections (140.1, 140.2) of the movable primary member (100) and the two outer sections (210.1, 210.2) of the reaction plate (200) are arranged to be parallel to each other, respectively.

5. The polyphase linear induction motor according to claim 2, wherein the two outer sections (140.1, 140.2) of the movable primary member (100) can be subdivided and arranged to be parallel to the two outer sections (210.1, 210.2) and (210.3, 210.4) of the reaction plate (200), respectively.

6. The polyphase linear induction motor according to claim 1, wherein the electrically-conductive reaction plate comprises variable stacked electrically-conductive layers wherein the electrical conductivity of the said layers on the stack can change from layer to layer.

7. A polyphase linear induction motor comprising:
a movable primary member (100), the primary member (100) including a magnetic material (110), a polyphase winding (120) arranged around the magnetic material; and
a stationary longitudinally-extending secondary member (150) separated from the primary member (100) by a gap, the secondary member (150) including variable stacked electrically-conductive layers to form a reaction plate (200), and a backing magnetic material (300) wherein the reaction plate (200) comprises a middle section (205) and two outer sections (210.1, 210.2) and wherein an angle of inclination between outer sections (210.1, 210.2) and middle section (205) is different at a first section and a second section along the axis of longitudinal extension of the reaction plate (200), the first section being located at a different location than the second section.

8. The polyphase linear induction motor according to claim 7, wherein the reaction plate comprising the variable stacked electrically-conductive layers (200) includes a variation of the materials used along the axis of longitudinal extension to provide for an effective variability of the electrical conductivity of the reaction plate (200) along an axis of longitudinal extension of the secondary member (150).

9. The polyphase linear induction motor according to claim 7, wherein the reaction plate comprising the variable stacked electrically-conductive layers (200) includes a stack of layers (210, 220), the first layer (210) and the second layer (220) of the stack of layers (210, 220) made of different material compositions providing for a different electrical conductivity.

10. The polyphase linear induction motor according to claim 9, wherein a thickness of a first layer (210) of the stack of layers (210, 220) is different from a thickness of a second layer (220) of the stack of layers (210, 220).

11. The polyphase linear induction motor according to claim 9, wherein a thickness of at least one of the layers of the stack of layers (210, 220) is variable when measured at different positions along the axis of longitudinal extension, to provide for the variability of the electrical conductivity of the reaction plate (200) by an increased cross-section of at least one of the layers of the stack of layers (210, 220).

12. The polyphase linear induction motor according to claim 9, wherein the first layer (210) includes a first substack of layers (212, 214, 216) and the second layer (220) includes a second substack of layers (222, 224, 226), each layer of the first and second substack of layers having a different thickness resulting in an increased thrust force to the primary member (100).

13. The polyphase linear induction motor according to claim 7, wherein the reaction plate comprising the variable stacked electrically-conductive layers (200) is lower at a first section at a first location along the axis of longitudinal extension of the secondary member (150) as compared to a second section at a second location along the axis of longitudinal extension of the secondary member (150), the first and second locations being different.

14. The polyphase linear induction motor according to claim 7, wherein the first section of the reaction plate (200) is located at an area designated for a higher relative speed of the movable primary member (100) relative to the secondary member (200) as compared to the second section.

* * * * *